(12) United States Patent
Hua et al.

(10) Patent No.: US 12,289,285 B2
(45) Date of Patent: Apr. 29, 2025

(54) COMMUNICATION METHOD, CP DEVICE, AND NAT DEVICE

(71) Applicant: Huawei Technologies Co., Ltd., Shenzhen (CN)

(72) Inventors: Rongrong Hua, Nanjing (CN); Zhouyi Yu, Beijing (CN); Tao Peng, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/157,662

(22) Filed: Jan. 20, 2023

(65) Prior Publication Data

US 2023/0171223 A1 Jun. 1, 2023

Related U.S. Application Data

(63) Continuation of application No. PCT/CN2021/101344, filed on Jun. 21, 2021.

(30) Foreign Application Priority Data

Jul. 22, 2020 (CN) .......................... 202010712973.3

(51) Int. Cl.
*H04L 61/2521* (2022.01)
*H04L 61/251* (2022.01)
*H04L 61/503* (2022.01)

(52) U.S. Cl.
CPC ........ *H04L 61/2521* (2013.01); *H04L 61/251* (2013.01); *H04L 61/503* (2022.05)

(58) Field of Classification Search
CPC . H04L 61/2521; H04L 61/251; H04L 61/503; H04L 45/304; H04L 45/76;
(Continued)

(56) References Cited

U.S. PATENT DOCUMENTS 10,129,207 B1 11/2018 Wan et al.
10,652,205 B2 * 5/2020 Xu ........................ H04L 61/255
(Continued)

FOREIGN PATENT DOCUMENTS

CN 105791452 A 7/2016
CN 106549790 A 3/2017
CN 108234139 A 6/2018

OTHER PUBLICATIONS

IEEE Std 802.1Q™, 2012 Edition, IEEE Standard for Local and metropolitan area networks—Media Access Control (MAC) Bridges and Virtual Bridged Local Area Networks, LAN/MAN standards Committee of the IEEE Computer Society, Dec. 13, 2012, 1782 pages.

(Continued)

*Primary Examiner* — Abdullahi E Salad
(74) *Attorney, Agent, or Firm* — Slater Matsil, LLP

(57) ABSTRACT

This application provides a communication method, a CP device, and a NAT device; pertains to the field of communication technologies; and relate to a scenario of performing NAT tracing based on a CU-separated BNG. The CP device delivers, to the NAT device, an IP address assigned to a user. Under a trigger condition of receiving the IP address delivered by the CP device, the NAT device assigns a public network IP address to the user, and reports the public network IP address to the CP device. The CP device adds, to an accounting packet, the IP address assigned by the CP device and the public network IP address assigned by the NAT device, and sends the accounting packet to a RADIUS server, to report the public network IP address to the RADIUS server, so that the NAT tracing is performed on the RADIUS server.

18 Claims, 18 Drawing Sheets

(58) Field of Classification Search
CPC .............. H04L 61/2514; H04L 61/2517; H04L 61/2571; H04L 63/0892; H04L 45/741; H04L 12/287; H04W 4/24
See application file for complete search history.

(56) References Cited

U.S. PATENT DOCUMENTS

| | | | | |
|---|---|---|---|---|
| 2005/0198227 | A1* | 9/2005 | Nakama | H04L 67/51 |
| | | | | 719/318 |
| 2013/0007237 | A1* | 1/2013 | Mehta | H04W 8/082 |
| | | | | 709/223 |
| 2018/0069782 | A1* | 3/2018 | Wosik | H04L 61/2532 |
| 2018/0132099 | A1* | 5/2018 | Li | H04L 61/5014 |
| 2018/0248792 | A1* | 8/2018 | Zhou | H04L 69/325 |
| 2021/0250844 | A1* | 8/2021 | Hu | H04W 4/23 |

OTHER PUBLICATIONS

Broadband Forum, "TR-459-Control and User Plane Separation for a disaggregated BNG", Issue: 1 Issue Date: Jun. 2020, 102 pages.
Broadband Forum, "TR-384-Cloud Central Office Reference Architectural Framework", Issue: 1, Issue Date: Jan. 2018, 80 pages.
Cascone, C. et al., "Tassen:Towards a Next-Generation BNG CUPS API", ONF Spotlight-Broadband, Jul. 2020, 22 pages.
Request for Comments: 7768, T. Tsou et al., Port Management to Reduce Logging in Large-Scale NATs, Jan. 2016, 11 pages.
Request for Comments: 8772, S. Hu et al., The China Mobile, Huawei, and ZTE Broadband Network Gateway (BNG) Simple Control and User Plane Separation Protocol (S-CUSP), May 2020, 65 pages.
S. Hu et al., "RFC 8772 The China Mobile, Huawei, and ZTE Broadband Network Gateway (BNG) Simple Control and User Plane Separation Protocol (S-CUSP)", May 2020, total: 124 pages.

* cited by examiner

COMMUNICATION METHOD, CP DEVICE, AND NAT DEVICE

CROSS-REFERENCE TO RELATED APPLICATIONS

This application is a continuation of International Application No. PCT/CN2021/101344, filed on Jun. 21, 2021, which claims priority to Chinese Patent Application No. 202010712973.3, filed on Jul. 22, 2020. The disclosures of the aforementioned applications are hereby incorporated by reference in their entireties.

TECHNICAL FIELD

This application relates to the field of communication technologies, and in particular, to a communication method, a CP device, and a NAT device.

BACKGROUND

As a quantity of broadband users increases rapidly, public network Internet protocol (IP) addresses (for example, public network Internet protocol version 4 (Internet Protocol version 4, IPV4) addresses) face a problem of insufficient resources. In view of this, a NAT device for executing a NAT technology such as a network address translation (NAT) technology and a carrier grade NAT (CGN) technology is provided to resolve this problem. Specifically, a gateway device such as a broadband network gateway (BNG) assigns a private network IP address to a user. The NAT device translates the private network IP address to a public network IP address, so that the public network IP address obtained after translation supports the user in accessing a public network. Because a plurality of private network IP addresses can be translated to the same public network IP address, a problem of insufficient public network IP address resources is effectively resolved. Because the private network IP address of the user is hidden due to deployment of a NAT function, it is usually required to implement a tracing function when the NAT function is deployed. The tracing indicates that the private network IP address of the user can be queried based on the public network IP address of the user, to lock the specific user based on the private network IP address.

In terms of an existence form, the NAT device is classified into a separate-style NAT device (for example, a separate-style CGN device) and a board-style NAT device (for example, a CGN card). A form of the separate-style NAT device is a separate device. The separate-style NAT device is in network connection to a gateway device such as a BNG through a line. A form of the board-style NAT device is a card. The board-style NAT device is inserted in a slot of the gateway device such as the BNG to be integrated with the gateway device.

When the gateway device is implemented by using a miniaturized device (for example, a mini BNG), because the miniaturized device does not have a separate slot for inserting the board-style NAT device, the NAT function is usually implemented by using the separate-style NAT device. In this case, the tracing function is usually implemented by using a log server in a traffic forwarding phase. Specifically, after user equipment sends a data packet, the data packet is forwarded to the NAT device. The NAT device receives the data packet, and translates a source IP address in the data packet from a private network IP address to a public network IP address. In addition, the NAT device generates a NAT log based on the private network IP address and the public network IP address. The NAT device sends the NAT log to the log server. The NAT log includes a mapping relationship between the private network IP address and the public network IP address. When the tracing is required, the log server queries the NAT log based on the public network IP address, and obtains, from the NAT log, the private network IP address corresponding to the public network IP address, to implement the tracing on the log server.

Currently, a tracing method based on the separate-style NAT device relies on the log server. Therefore, a carrier needs to invest in establishment of the log server to implement the tracing. This causes excessively high tracing costs.

SUMMARY

Embodiments of this application provide a communication method, a CP device, and a NAT device, to help reduce the tracing costs. Technical solutions are as follows:

According to a first aspect, a communication method is provided. The method is applied to a communications system in which a control plane (CP) and a user plane (UP) are separated. For example, a CP device performs the method. The CP device assigns an IP address to a user. The CP device delivers the assigned IP address to a NAT device. Under a trigger condition of receiving the IP address delivered by the CP device, the NAT device assigns, to the user, a public network IP address that corresponds to the IP address delivered by the CP device, and reports the public network IP address to the CP device. The CP device adds, to an accounting packet based on the public network IP address reported by the NAT device, the IP address assigned by the CP device and the public network IP address assigned by the NAT device, and sends the accounting packet to a remote authentication dial in user service (RADIUS) server, to report the IP address assigned by the CP device and the public network IP address assigned by the NAT device to the RADIUS server, thereby performing NAT tracing on the RADIUS server.

Because the NAT tracing uses a RADIUS tracing manner, tracing can be performed through multiplexing the RADIUS server. This manner is free from a limitation that a log server needs to be established for the tracing, to reduce the tracing costs. In addition, this manner is applicable to a scenario in which the NAT device is implemented by using a separate-style NAT device. This helps resolve problems such as insufficient UP slots and a poor NAT processing capability when the NAT device is implemented by using a board-style NAT device such as a service board.

Optionally, the first IP address includes at least one of a private network IPV4 address or an Internet protocol version 6 (IPv6) address.

In this optional manner, the CP device assigns the private network IPv4 address and delivers the private network IPV4 address to the NAT device. This helps implement RADIUS tracing in a NAT44 (NAT IPv4-IPV4) scenario. The CP device assigns the IPV6 address and delivers the IPV6 address to the NAT device. This helps implement RADIUS tracing in a dual-stack network such as a dual-stack lite (dual stack lite, DS-Lite) scenario.

Optionally, the communications system includes a gateway system. The gateway system is a broadband network gateway BNG system or a broadband remote access server (virtual broadband remote access server, BRAS) system.

In this optional manner, a CP in the BNG system or a CP in the BRAS system is selected to implement a solution in this embodiment, to help multiplex network architecture of the BNG system or the BRAS system, thereby reducing implementation complexity.

Optionally, the accounting packet further includes a port block. The port block includes at least one port number that is assigned by the NAT device to the user. That the CP device receives a second IP address from the NAT device includes: The CP device receives information about the user from the NAT device. The information about the user includes a correspondence among the first IP address, the second IP address, and the port block.

Optionally, before the CP device receives the port block from the NAT device, the method further includes: The CP device receives a port block set from the RADIUS server. The port block set includes the port block. The CP device sends the port block set to the NAT device.

In this optional manner, in a scenario in which a carrier needs to specify a range of the port block of the user, the RADIUS server delivers the port block set to the CP device, and then the CP device delivers the port block set to the NAT device, to specify the NAT device to assign the port block in the port block set, thereby meeting a requirement for specifying the range of the port block during the NAT. Particularly, the CP delivers, to the NAT device, the IP address and the port block set specified by the RADIUS server. In this way, a process of specifying the range of the port block by the RADIUS server and a process of triggering the NAT device to assign the public network IP address can be simultaneously performed, thereby reducing communication overheads and implementation complexity.

Optionally, after the CP device sends the accounting packet to the RADIUS server, the method further includes at least one of the following: If the user is offline, the CP device sends a delete message to the NAT device. The delete message is used to indicate the NAT device to delete the information that is about the user and that is stored in the NAT device. If the user is offline, the CP device deletes the information that is about the user and that is stored in the CP device.

In this optional manner, the CP device indicates the NAT device to delete the information about the user when the user is offline, and releases, in time, storage space that is occupied in the NAT device by the information about the offline user, thereby saving a storage resource of the NAT device and avoiding a resource depletion problem of the NAT device. The CP device deletes the locally stored information about the user when the user is offline, and releases, in time, the storage space that is occupied in the CP device by the information about the offline user, thereby saving a storage resource of the CP device and avoiding a resource depletion problem of the CP device.

Optionally, the NAT device includes an active NAT device and a standby NAT device in a dual-host standby relationship. That the CP device receives the second IP address from the NAT device includes: The CP device receives the information about the user from the active NAT device.

In this optional manner, the CP device delivers, to the standby NAT device, the information that is about the user and that is sent by the active NAT device, so that the standby NAT device obtains the information that is about the user and that is stored in the active NAT device. The information about the user is synchronized between the standby NAT device and the active NAT device, so that active-standby switching can be triggered when the active NAT device is faulty, to implement normal running of a service. In addition, an active-standby election mechanism similar to a virtual router redundancy protocol (VRRP) does not need to be deployed for the standby NAT device and the active NAT device. In this way, the active NAT device and the standby NAT device do not need to be directly connected through a line, thereby simplifying a configuration and deployment of resources.

Optionally, after the CP device receives the information about the user from the active NAT device, the method further includes:

The CP device sends the information about the user to the standby NAT device.

Optionally, the method further includes: If the active NAT device is in a faulty state, the CP device sends a first update message to the standby NAT device. The first update message is used to indicate the standby NAT device to improve a route priority corresponding to the second IP address.

When the active NAT device is faulty, the CP device delivers the first update message to the standby NAT device, to indicate the standby NAT device to adjust the route priority corresponding to the public network address. Because the route priority corresponding to the public network address of the standby NAT device is improved, traffic on a network side is switched from the active NAT device to the standby NAT device, so that the standby NAT device is upgraded to the active NAT device and replaces the previously faulty active NAT device to process the traffic on the network side, thereby avoiding transmission interruption of the traffic. In addition, because the switching of the traffic is directed by the CP device, it can be ensured that traffic bypass does not occur for the active NAT device and the standby NAT device. Particularly, the method can be applied to the NAT44 scenario. This helps implement dual-host standby in the NAT44 scenario.

Optionally, the method further includes: If the active NAT device is in the faulty state, the CP device sends a second update message to the standby NAT device. The second update message is used to indicate the standby NAT device to improve a route priority corresponding to a third IP address. The third IP address is an IP address of a tunnel endpoint. The tunnel endpoint includes the active NAT device or the standby NAT device.

When the active NAT device is faulty, the CP device delivers the first update message and the second update message to the standby NAT device, to indicate the standby NAT device to adjust the route priority corresponding to the public network address and the route priority corresponding to the address of the tunnel endpoint. Because the route priority corresponding to the public network address of the standby NAT device is improved, the traffic on the network side is switched from the active NAT device to the standby NAT device. Because the route priority corresponding to the address of the tunnel endpoint of the standby NAT device is improved, traffic on a user side is switched from the active NAT device to the standby NAT device. Therefore, the standby NAT device is upgraded to the active NAT device and replaces the previous faulty active NAT device to process the traffic on the network side and the traffic on the user side, thereby avoiding transmission interruption of the traffic. In addition, because the switching of the traffic is directed by the CP device, it can be ensured that traffic bypass does not occur for the active NAT device and the standby NAT device. Particularly, the method can be applied to the DS-Lite scenario. This helps implement dual-host standby in the DS-Lite scenario.

According to a second aspect, a communication method is provided. For example, the method is performed by a NAT device. The NAT device receives, from a CP device, a first IP address that is assigned by the CP device to a user. The CP device is a CP device in a communications system in which a CP and a UP are separated. The NAT device assigns a second IP address to the user. The second IP address is a public network IP address. The NAT device sends the second IP address to the CP device. The NAT device assigns the public network IP address, and then reports the public network IP address to the CP device. In this way, the CP device adds, to an accounting packet, the IP address assigned by the CP device and the public network IP address assigned by the NAT device, and sends the accounting packet to a remote authentication dial in user service (RADIUS) server, to report the IP address assigned by the CP device and the public network IP address assigned by the NAT device to the RADIUS server, thereby performing NAT tracing on the RADIUS server.

Because the NAT tracing uses a RADIUS tracing manner, tracing can be performed through multiplexing the RADIUS server. This manner is free from a limitation that a log server needs to be established for the tracing, to reduce the tracing costs. In addition, this manner is applicable to a scenario in which the NAT device is implemented by using a separate-style NAT device. This helps resolve problems such as insufficient UP slots and a poor NAT processing capability when the NAT device is implemented by using a board-style NAT device such as a service board.

Optionally, after the NAT device receives, from the CP device, the first IP address assigned by the CP device to the user, the method further includes: The NAT device assigns a port block to the user. The port block includes at least one port number. The NAT device sends the port block to the CP device.

Optionally, before the NAT device assigns the port block to the user, the method further includes: The NAT device receives a port block set from the CP device. That the NAT device assigns the port block to the user includes: The NAT device assigns the port block in the port block set to the user.

Optionally, after the NAT device assigns the second IP address to the user, the method further includes: The NAT device stores information about the user. The information about the user includes a correspondence among the first IP address, the second IP address, and the port block.

Optionally, that the NAT device sends the second IP address to the CP device includes: The NAT device sends the information about the user to the CP device.

Optionally, after the NAT device sends the second IP address to the CP device, the method further includes: The NAT device receives a delete message from the CP device. The NAT device deletes the information about the user in response to the delete message.

Optionally, the NAT device is a standby NAT device in an active NAT device and the standby NAT device in a dual-host standby relationship. Before the NAT device assigns the second IP address to the user, the method further includes:

The standby NAT device receives the information about the user from the CP device. The information about the user includes the correspondence among the first IP address, the second IP address, and the port block. The port block includes at least one port number. That the NAT device assigns the second IP address to the user includes: When the active NAT device is faulty, the standby NAT device assigns the second IP address to the user based on the information about the user.

Optionally, the method further includes: The standby NAT device receives a first update message from the CP device.

In response to the first update message, the standby NAT device improves a route priority corresponding to the second IP address.

Optionally, the method further includes: The standby NAT device receives a second update message from the CP device.

In response to the second update message, the standby NAT device improves a route priority corresponding to a third IP address. The third IP address is an IP address of a tunnel endpoint. The tunnel endpoint includes the active NAT device or the standby NAT device.

According to a third aspect, a CP device is provided. The CP device is in a communications system in which a CP and a UP are separated. The CP device includes: an assignment unit, configured to assign a first IP address to a user; a sending unit, configured to send the first IP address to a NAT device; and a receiving unit, configured to receive a second IP address from the NAT device, where the second IP address is a public network IP address that is assigned by the NAT device to the user.

The sending unit is further configured to send an accounting packet to a RADIUS server. The accounting packet includes the first IP address and the second IP address.

Optionally, the first IP address includes at least one of a private network IPv4 address or an IPv6 address.

Optionally, the communications system includes a gateway system. The gateway system is a BNG system or a BRAS system.

Optionally, the accounting packet further includes a port block. The port block includes at least one port number that is assigned by the NAT device to the user.

The receiving unit is configured to store information about the user from the NAT device. The information about the user includes a correspondence among the first IP address, the second IP address, and the port block.

Optionally, the receiving unit is further configured to receive a port block set from the RADIUS server. The port block set includes the port block.

The sending unit is further configured to send the port block set to the NAT device.

Optionally, the sending unit is further configured to: if the user is offline, send a delete message to the NAT device. The delete message is used to indicate the NAT device to delete the information that is about the user and that is stored in the NAT device.

The CP device further includes: a deletion unit, configured to: if the user is offline, delete the information that is about the user and that is stored in the CP device.

Optionally, the NAT device includes an active NAT device and a standby NAT device in a dual-host standby relationship. The receiving unit is configured to receive the information about the user from the active NAT device.

Optionally, the sending unit is further configured to send the information about the user to the standby NAT device.

Optionally, the sending unit is further configured to: if the active NAT device is in a faulty state, send a first update message to the standby NAT device. The first update message is used to indicate the standby NAT device to improve a route priority corresponding to the second IP address.

Optionally, the sending unit is further configured to: if the active NAT device is in a faulty state, send a second update message to the standby NAT device. The second update message is used to indicate the standby NAT device to improve a route priority corresponding to a third IP address. The third IP address is an IP address of a tunnel endpoint. The tunnel endpoint includes the active NAT device or the standby NAT device.

In some embodiments, the units in the CP device provided in the third aspect are implemented by using software. The units in the CP device are program units. In some other embodiments, the units in the CP device provided in the third aspect are implemented by using hardware or firmware.

According to a fourth aspect, a NAT device is provided. The NAT device includes: a receiving unit, configured to receive, from a CP device, a first IP address that is assigned by the CP device to a user, where the CP device is a CP device in a communications system in which a CP and a UP are separated; an assignment unit, configured to assign a second IP address to the user, where the second IP address is a public network IP address; and a sending unit, configured to send the second IP address to the CP device.

Optionally, the assignment unit is further configured to assign a port block to the user. The port block includes at least one port number.

The sending unit is further configured to send the port block to the CP device.

Optionally, the receiving unit is further configured to receive a port block set from the CP device.

The assignment unit is configured to assign the port block in the port block set to the user.

Optionally, the NAT device further includes: a storing unit, configured to store information about the user. The information about the user includes a correspondence among the first IP address, the second IP address, and the port block.

Optionally, the sending unit is configured to send the information about the user to the CP device.

Optionally, the receiving unit is further configured to receive a delete message from the CP device.

The NAT device further includes: a deletion unit, configured to delete the information about the user in response to the delete message.

Optionally, the NAT device is a standby NAT device in an active NAT device and the standby NAT device in a dual-host standby relationship. The receiving unit is further configured to receive the information about the user from the CP device. The information about the user includes the correspondence among the first IP address, the second IP address, and the port block. The port block includes at least one port number.

The assignment unit is further configured to: when the active NAT device is faulty, assign the second IP address to the user based on the information about the user.

Optionally, the receiving unit is further configured to receive a first update message from the CP device. The NAT device further includes: an improving unit, configured to: in response to the first update message, improve a route priority corresponding to the second IP address.

Optionally, the receiving unit is further configured to receive a second update message from the CP device. The NAT device further includes: an improving unit, configured to: in response to the second update message, improve a route priority corresponding to a third IP address. The third IP address is an IP address of a tunnel endpoint. The tunnel endpoint includes the active NAT device or the standby NAT device.

In some embodiments, the units in the NAT device provided in the fourth aspect are implemented by using software. The units in the NAT device are program units. In some other embodiments, the units in the NAT device provided in the fourth aspect are implemented by using hardware or firmware.

According to a fifth aspect, a CP device is provided. The CP device includes a processor and a communications interface. The processor is configured to execute instructions so that the CP device performs the communication method provided in the first aspect or any optional manner of the first aspect. The communications interface is configured to receive or send a packet. For specific details of the CP device provided in the fifth aspect, refer to the first aspect or any optional manner of the first aspect. Details are not described herein again.

According to a sixth aspect, a NAT device is provided. The NAT device includes a processor and a communications interface. The processor is configured to execute instructions so that the NAT device performs the communication method provided in the second aspect or any optional manner of the second aspect. The communications interface is configured to receive or send a packet. For specific details of the NAT device provided in the sixth aspect, refer to the second aspect or any optional manner of the second aspect. Details are not described herein again.

According to a seventh aspect, a computer-readable storage medium is provided. The storage medium stores at least one instruction. The instruction is read by a processor so that a CP device performs the communication method provided in the first aspect or any optional manner of the first aspect.

According to an eighth aspect, a computer-readable storage medium is provided. The storage medium stores at least one instruction. The instruction is read by a processor so that a NAT device performs the communication method provided in the second aspect or any optional manner of the second aspect.

According to a ninth aspect, a computer program product is provided. The computer program product includes computer instructions. The computer instructions are stored in a computer-readable storage medium. A processor of a CP device reads the computer instructions from the computer-readable storage medium. The processor executes the computer instructions so that the CP device performs the communication method provided in the first aspect or any optional manner of the first aspect.

According to a tenth aspect, a computer program product is provided. The computer program product includes computer instructions. The computer instructions are stored in a computer-readable storage medium. A processor of a NAT device reads the computer instructions from the computer-readable storage medium. The processor executes the computer instructions so that the NAT device performs the communication method provided in the first aspect or any optional manner of the first aspect.

According to an eleventh aspect, a chip is provided. When the chip is run on a CP device, the CP device is enabled to perform the communication method provided in the first aspect or any optional manner of the first aspect.

According to a twelfth aspect, a chip is provided. When the chip is run on a NAT device, the NAT device is enabled to perform the communication method provided in the second aspect or any optional manner of the second aspect.

According to a thirteenth aspect, a communications system is provided. The communications system includes a CP device and a NAT device. The CP device is configured to perform the method in the first aspect or any optional manner of the first aspect. The NAT device is configured to perform the method in the second aspect or any optional manner of the second aspect.

According to a fourteenth aspect, a CP device is provided. The CP device includes: a central processing unit, a network processor, and a physical interface. The central processing unit is configured to perform the following operation: assigning a first IP address to a user.

The network processor is configured to trigger the physical interface to perform the following operations: sending the first IP address to a NAT device; receiving a second IP address from the NAT device; and sending an accounting packet to a RADIUS server.

Optionally, the CP device includes a main control board and an interface board. The central processing unit is disposed on the main control board. The network processor and the physical interface are disposed on the interface board. The main control board and the interface board are coupled.

In a possible implementation, an inter-process communication (inter-process communication, IPC) channel is established between the main control board and the interface board. Communication is performed between the main control board and the interface board by using the IPC channel.

According to a fifteenth aspect, a NAT device is provided. The NAT device includes: a central processing unit, a network processor, and a physical interface. The central processing unit is configured to perform the following operation: assigning a second IP address to a user.

The network processor is configured to trigger the physical interface to perform the following operations: receiving a first IP address from a CP device; and sending the second IP address to the CP device.

Optionally, the NAT device includes a main control board and an interface board. The central processing unit is disposed on the main control board. The network processor and the physical interface are disposed on the interface board. The main control board and the interface board are coupled.

In a possible implementation, an inter-process communication (IPC) channel is established between the main control board and the interface board. Communication is performed between the main control board and the interface board by using the IPC channel.

DETAILED DESCRIPTION OF ILLUSTRATIVE EMBODIMENTS

Figure 1:
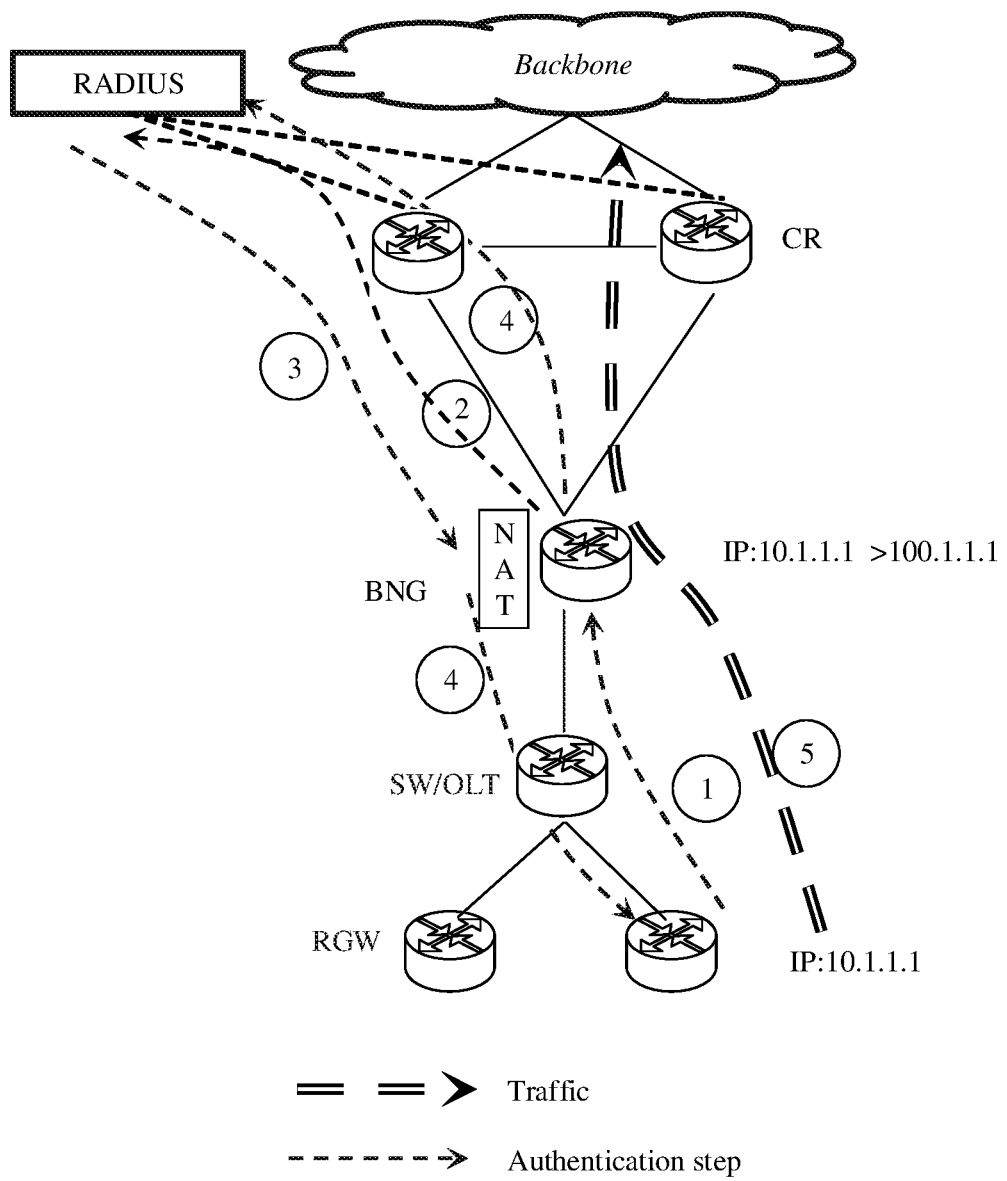
FIG. 1 is a schematic diagram of NAT performed by using a BNG system according to an embodiment of this application.

To make objectives, technical solutions, and advantages of this application clearer, the following further describes implementations of this application in detail with reference to the accompanying drawings.

The following first describes concepts of some terms in embodiments of this application.

(1) Control Plane and User Plane Separated (Control Plane and User Plane Disaggregated, CU-Separated)

With development of a software-defined networking (software defined network, SDN) technology and a network functions virtualization (NFV) technology, a metropolitan area network evolves from conventional network-based architecture to data center-based network architecture. A conventional network element device evolves from specialization to universalization. Evolvement of the conventional network element device from specialization to universalization mainly resolves two types of decoupling: control and forwarding decoupling, and software and hardware decoupling.

In view of this, a CU separation technology emerges accordingly, and becomes a research hotspot in this field. The CU separation indicates network architecture in which the CP and the UP are decoupled. The CU separation includes but is not limited to an implementation A and an implementation B in the following:

In the implementation A, a control plane and a forwarding plane are located on different hardware devices.

When the implementation A is used, a CP device and a UP device are two different separate devices. Optionally, the CP device and the UP device are distributed at different locations. For example, the CP device is located in a data center at a cloud, and the UP device is deployed at a proper location in a network according to a requirement. In this manner, deployment of the control plane and the forwarding plane is more flexible.

In the implementation B, the control plane and the forwarding plane are located on the same hardware device, and are separated in terms of functions.

When the implementation B is used, a physical entity of the CP device and a physical entity of the UP device are the same device. For example, the CP device and the UP device are run in the same host, the same server, or the same terminal.

In some embodiments, the CP device and the UP device are both implemented by using a virtualization technology. The CP device is, for example, referred to as a virtual CP (vCP), and the UP device is, for example, referred to as a virtual UP (vUP). For example, the CP device is a virtual machine, and the UP device is a virtual router or a virtual switch. In some embodiments, the CP device and the UP device are both implemented in combination with a VNF technology based on a general-purpose physical server. The CP device and the UP device are two different virtualized network functions (VNFs). For example, the CP device and the UP device are both network elements virtualized by using an X86 server.

In some other embodiments, the CP device is implemented by using a virtualization technology, and the UP device is implemented by using a conventional network device. The UP device is, for example, referred to as a physical UP (pUP).

This embodiment does not limit a quantity relationship between the CP device and the UP device in a communications system. In some embodiments, a one-to-many relationship exists between the CP device and the UP device. In other words, one CP device is configured to control a plurality of UP devices. In some other embodiments, a one-to-one relationship exists between the CP device and the UP device. In other words, one CP device is configured to control one UP device.

This embodiment does not limit a quantity of UP devices in the communications system. Optionally, a CU-separated communications system includes a plurality of UP devices. Optionally, the plurality of UP devices in the CU-separated communications system are distributed at different locations. Optionally, the plurality of UP devices in the CU-separated communications system cooperate with each other to share a forwarding task based on distributed architecture.

It needs to be noted that the "CU separation" may have different names. For example, different standards, different versions of the same standard, different vendors, and different application scenarios may have different names for the "CU separation". For example, the term "CU separation" sometimes may be referred to as "control and forwarding separation", "forwarding and control separation", "control plane and user plane separation", "control and user separation", or the like.

It needs to be noted that the "CP" may have different names. For example, different standards, different versions of the same standard, different vendors, and different application scenarios may have different names for the "CP". For example, the term "CP" may sometimes be referred to as a "CP function (CPF)" or the "CP plane". In this specification, the terms "CP", "CPF", and "CP plane" may be used interchangeably. The term "CP device" indicates any device for implementing the CP function.

It needs to be noted that the "UP" may have different names. For example, different standards, different versions of the same standard, different vendors, and different application scenarios may have different names for the "UP". For example, the term "UP" may sometimes be referred to as the "UP function (UPF)" or the "UP plane". In this specification, the terms "UP", "UPF", and "UP plane" may be used interchangeably. The term "UP device" indicates any device for implementing the UP function.

(2) BNG System

The BNG system, as a conventional broadband access gateway device, is used to undertake a function of accessing user equipment to a broadband network, and is very important in a broadband access service and scenario of a user. Main requirements of the BNG system for user access are user authentication, access control, traffic scheduling, and the like. A BNG is mainly responsible for authentication and Internet protocol (IP) address assignment. In some embodiments, the authentication process is implemented based on a remote authentication dial in user service (RADIUS). For example, the BNG, as a RADIUS client, interacts with the RADIUS server to complete authentication of a terminal. A protocol stack for processing of the BNG includes but is not limited to the IP over Ethernet (internet protocol over Ethernet, IPoE), a point-to-point protocol over Ethernet (PPPOE), an 802.1ad protocol, an Ethernet protocol, and some 802.3 physical layer (some 802.3 phy) protocols.

(3) CU-Separated BNG System

With emergence of various Internet services, a requirement for a quantity of sessions of the user that are supported by the BNG system is constantly enhanced, an access bandwidth of the user needs to be constantly increased, and especially a requirement for a service exposure capability and a programming-allowed capability of the BNG system. In view of these requirements, the BNG system implements control and forwarding decoupling and software and hardware decoupling based on SDN or NFV architecture, and becomes the CU-separated BNG system; and therefore, has advantages brought by the CU-separated architecture.

For example, the CP device in the BNG system controls a plurality of UP devices in the BNG system. The CP device schedules the plurality of UP devices to process a forwarding task. The CP device assigns resources to the plurality of UP devices. Therefore, in comparison with a manner of implementing the BNG system by using a single device, utilization and reliability of the device in the BNG system with the CU-separated architecture can be greatly improved.

It needs to be noted that the "CU-separated BNG" in this embodiment of this application may have different names. For example, different standards, different versions of the same standard, different vendors, and different application scenarios may have different names for the "CU-separated BNG". For example, the term "CU-separated BNG" may sometimes be referred to as a "disaggregated BNG (DBNG) system". Correspondingly, the CP device in the CU-separated BNG may be referred to as DBNG-CP, and the UP device in the CU-separated BNG may be referred to as DBNG-UP. For another example, the term "CU-separated BNG" may sometimes be referred to as a "virtual broadband network gateway (virtual BNG, vBNG) system in which a control plane and a user plane are separated (control plane and user plane disaggregated System, CU system)", that is, a "vBNG CU system". Correspondingly, the CP device in the CU-separated BNG may be referred to as vBNG-CP, and the UP device in the CU-separated BNG may be referred to as vBNG-UP. For another example, the term "CU-separated BNG" may sometimes be referred to as a "virtual broadband remote access server (vBRAS) CU system", that is, a "vBRAS CU system". Correspondingly, the CP device in the CU-separated BNG may be referred to as vBRAS-CP, and the UP device in the CU-separated BNG may be referred to as vBRAS-UP. In this specification, the "DBNG", the "vBNG CU system", and the "vBRAS CU system" may be usually used interchangeably.

(4) User

The user in this embodiment of this application includes but is not limited to customer premise equipment (CPE) or a terminal. In some embodiments, at least one terminal accesses the CPE, and the CPE accesses the BNG system. That the BNG system assigns an IP address to the user indicates that the BNG system assigns an IP address to the CPE. The CPE further assigns an IP address to each terminal. In some other embodiments, that the BNG system assigns the IP address to the user indicates that the BNG system assigns the IP address to the terminal.

(5) Carrier-Grade NAT (CGN)

In a narrow sense, the CGN indicates large-scale NAT, and is specifically a technology in which Internet protocol version 4 (IPv4) private addresses are deployed on a scale, to collect statistics of a current public network IPv4 address and multiplex the current public network IPv4 address. In the CGN, utilization of an IPV4 address can be improved, so that an IPV4 address depletion problem can be resolved in a relatively long time, to ensure smooth transition of a service. In this way, a time is contended for deploying an Internet protocol version 6 (IPv6) address. For an existence form of a CGN device, the CGN device is classified into a separate-style CGN device and a board-style CGN device.

(6) Separate-Style CGN Device

The separate-style CGN device is an independent device. The device specifically undertakes a CGN function. The separate-style CGN device is, for example, deployed on the BNG system in bypass mode. For example, in an uplink traffic forwarding process, private network IPv4 traffic of the user is directed to the separate-style CGN device. After performing NAT processing, the separate-style CGN device returns, to the BNG system, public network IPV4 traffic obtained after the NAT translation. When the separate-style CGN device is used, address translation and user management are, for example, separately performed in the CGN system and the BNG system.

The board-style CGN device indicates that a board with the CGN function is inserted in a device with another function. The board-style CGN device occupies one slot of the device.

(7) Nat44

The NAT44 (NAT IPv4-IPV4) indicates to translate one IPv4 address to another IPV4 address. For example, a private network IPv4 address is translated into a public network IPv4 address.

(8) Dual Stack (DS)

The dual stack indicates to install both an IPV4 protocol stack and an IPV6 protocol stack on a device, to implement information exchange between the device and an IPV4 node or an IPv6 node.

(9) Dual Stack Lite (DS-Lite)

In the DS-Lite technology, there is no transition between different address families. Essentially, the DS-Lite is deploying an IPV4-in-IPv6 tunnel in an IPv6 network to complete IPv4 service transmission. Herein, an IPV6 service is directly transmitted by using the IPV6 network. For example, routed CPE serves as a basic bridging broadband (B4) for the DS-Lite. The BNG system serves as an IPv6-only node. The CGN device is deployed in a metropolitan area network. The CGN device serves as an address family transition router (AFTR) for the DS-Lite. An IPV6-only network exists among the CPE, the BNG system, and the CGN device, and a dual-stack network exists between the CGN device and a core router (CR). When the DS-Lite is used, dual-stack only needs to be deployed in some devices in the metropolitan area network, that is, dual stack lite. This is referred to as a DS-Lite solution.

(10) B4

B4 has a dual-stack capability and is implemented on a host or a CPE device. The CPE device is a residential gateway in carrier networking. B4 creates an IPV4-in-IPv6 tunnel to the AFTR.

(11) AFTR

The IPV4-in-IPv6 tunnel terminates at the AFTR. The AFTR implements functions of the NAT44. The AFTR is CGN in a carrier network. The CGN may be a separate-style CGN device, or may be a board-style CGN device.

(12) Address Tracing

Due to specific deployment of the CGN, IP address information of a private network user is hidden. The national security department requires that the deployment of the CGN has a tracing-enabled capability, to query an IP address of the private network user based on a public network address and a port number and further lock the specific user. In some embodiments of this application, a RADIUS tracing manner is used for the address tracing.

(13) RADIUS Tracing

The RADIUS tracing indicates the address tracing performed on the RADIUS server. The RADIUS tracing is implemented, for example, through a process of sending an accounting packet. For example, after the BNG system assigns a public network IP address and a port block to the user, the BNG system adds the public network IP address and the port block to the accounting packet. The BNG system sends the accounting packet to the RADIUS server, to report the public network IP address and the port block to the RADIUS server. For example, when the user is online, the BNG system sends an accounting start packet to the RADIUS server. The RADIUS server receives the accounting start packet and records a RADIUS log once based on the accounting start packet. When the user is offline, the BNG system sends an accounting end packet to the RADIUS server. The RADIUS server receives the accounting end packet and records the RADIUS log once based on the accounting end packet. The RADIUS server performs address tracing based on the RADIUS log recorded twice. The RADIUS log recorded based on the accounting start packet includes a correspondence among a private network IP address, a public network IP address, a port block, and a user online time. The user online time is, for example, an accounting start time in the accounting start packet. The RADIUS log recorded based on the accounting end packet includes a correspondence among a private network IP address, a public network IP address, a port block, and a user online time. A user offline time is, for example, an accounting end time in the accounting end packet.

(14) Port Block

The port block is also referred to as a port range. The port block includes at least one port number assigned to the user by the NAT device. For example, the BNG system assigns one public network IP address and one port segment for one private network IP address. When NAT processing is performed on the private network IP address, the public network IP address and the port number in the port segment are both used.

(15) Inter-Chassis Backup

The inter-chassis backup indicates that a CPU in a device and a CPU in another device are in a dual-host standby relationship. When an inter-chassis backup solution is used, an active NAT instance and a standby NAT instance are CPUs on two different hardware devices. The NAT instance is a specific NAT device. For example, the active NAT instance is a number 0 CPU in a number 1 slot of a CGN device 1, and the standby NAT instance is a number 0 CPU in a number 2 slot of a CGN device 2.

(16) Inter-Chassis Warm Backup

The inter-chassis warm backup indicates that in a normal running scenario of a service, the active NAT device performs service processing, and the standby NAT device backs up information about the user in real time. In a failover scenario, the active NAT device is faulty, and the standby NAT device is switched to an active NAT device. The service processing is performed based on the information that is about the user and that is backed up in advance.

Embodiments of this application relate to application of a NAT technology. For ease of understanding, the following describes an application scenario of the NAT technology and some cases of the NAT technology in application.

Due to a limited quantity of public network IP addresses (for example, public network IPv4 addresses), IP address depletion has become a technical problem urgently to be resolved. In view of this, the BNG system usually assigns a private network IP address to a broadband dial-up user. NAT address translation is performed on the traffic of the user, to translate a private network IP address of the user to a public network IP address. Due to a one-to-many relationship between the public network IP address and the user, statistics collection and multiplexing functions for the public network IP address is implemented, to improve utilization of the public network IP address, thereby resolving a problem of the limited quantity of public network IP addresses. During application, the NAT technology faces the following cases 1 and 2.

Case 1: Tracing is Implemented by Using the Board-Style CGN Device and the RADIUS Server.

In some embodiments, the NAT device selects to be implemented by using the board-style CGN device. The UP device (for example, a mini BNG device) in the BNG system is inserted in the board-style CGN device to implement the RADIUS tracing. In this case, because the UP device and the CGN device are integrated together, the NAT address translation is performed on the BNG system. For example, FIG. 1 shows a process of performing the NAT on the BNG system. This specifically includes the following steps 1 to 5.

Step 1: The user sends a dialing request. The dialing request is used to apply for an IP address from the BNG system. For example, in FIG. 1, the dialing request is transmitted from a terminal to a residential gateway (RGW), and then to a switch (SW) or an optical line terminal (optical line termination, OLT) by using the RGW, and further to the BNG system by using the SW or the OLT.

Step 2: The BNG system receives the dialing request and initiates an authentication request to the RADIUS server.

Step 3: The RADIUS server receives the authentication request, generates an authentication result, and returns the authentication result to the BNG system.

Step 4: The BNG system assigns the private network IP address, the public network IP address of the user, and the port block to the user according to a configuration. In addition, the BNG system sends the accounting packet to the RADIUS server, and adds the public network IP address of the user and the port block based on a RADIUS attribute, to implement NAT tracing of the user.

Step 5: The terminal sends traffic. The traffic is forwarded to the BNG system. The BNG system performs the NAT translation on the traffic, sends the translated traffic to a public network side, so that the user accesses a public network. For example, as shown in FIG. 1, a source IP address of the traffic is a private network IPV4 address (10.1.1.1), and the BNG system translates the private network IPv4 address (10.1.1.1) to a public network IPv4 address (100.1.1.1).

In a NAT scenario, there are two defects when the case 1 is applied.

There are many level-2 carriers renting metropolitan area networks of level-1 carriers outside China. The level-2 carriers deploy large-capacity frame-shaped BNG systems at a higher layer. However, with sinking of a CDN, for ease of maintenance, the carriers want to sink the BNG to an edge, and select to use mini BNG devices to implement the BNG system. Because the BNG system is miniaturized, the BNG system can meet a space requirement and a power consumption requirement of an equipment room. However, the relatively large frame-shaped BNG device has a slot suitable for inserting the board-style CGN device, and the mini BNG device does not have a separate slot for inserting the board-style CGN device. Therefore, the board-style CGN device can be implemented only on the relatively large frame-shaped BNG device. A line processing board of the mini BNG device has a very weak NAT forwarding capability, and therefore, cannot meet a requirement for the NAT translation.

In addition, in a steering scenario, after the board-style CGN device is inserted in the UP device, if the CP device steers the user from an original CP device to a target UP device, NAT tracing information needs to be refreshed. Refreshing of the NAT tracing information indicates that the NAT tracing information of the steered user is stored on the board-style CGN device inserted in the target UP device. Specifically, the board-style CGN device inserted in the target UP device needs to assign a public network IP address and a port block to each steered user. In addition, the board-style CGN device needs to send an accounting update packet to each steered user. However, because the board-style CGN device is merely a card, a computing capability of the board-style CGN device is insufficient. It is difficult to undertake a task of refreshing NAT tracing information generated in steering of a large quantity of users. As a result, a speed of refreshing the NAT tracing information is very low, and cannot match a rate at which the CP device delivers a user entry. Therefore, an interruption time of a user service is extremely long. The Steering scenario is also referred to as an online dynamic steering scenario of the user. The Steering scenario indicates a case in which an online user is steered from one UP device to another UP device.

Case 2: Tracing is Implemented by Using the Separate-Style CGN Device and a Log Server.

Figure 2:
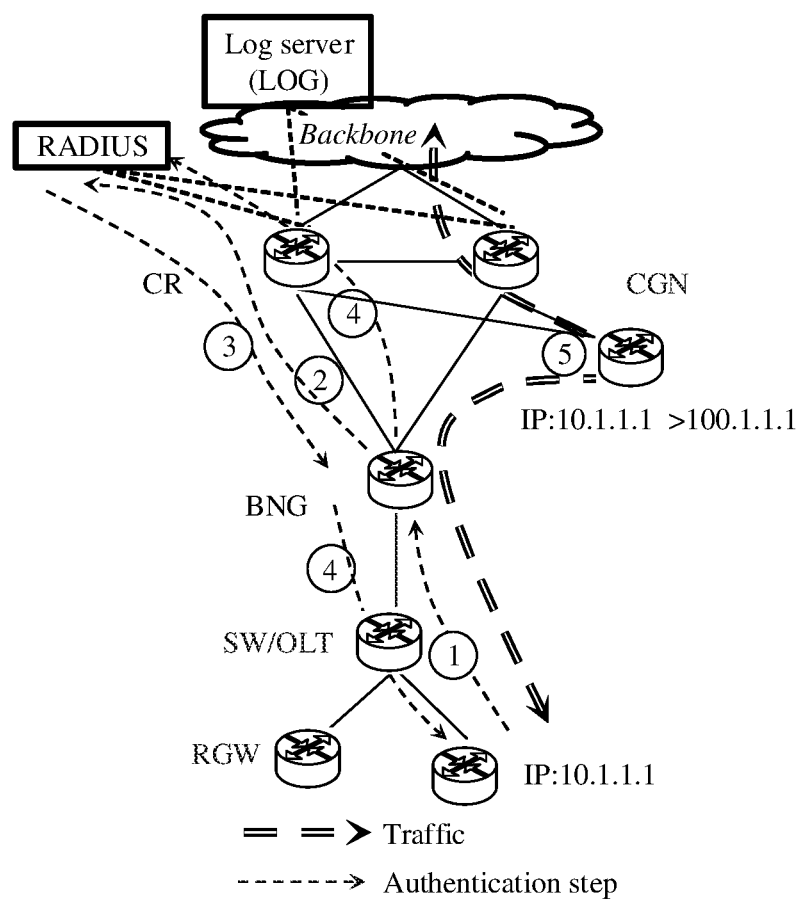
FIG. 2 is a schematic diagram of NAT performed by using a separate-style CGN device and a log server according to an embodiment of this application.

Architecture in which the separate-style CGN device at a higher layer is combined with the log server can be used to resolve a problem that the board-style CGN device has an insufficient NAT translation capability in the case 1. For example, FIG. 2 shows a process of performing the NAT by using the separate-style CGN device and the log server. This specifically includes the following steps 1 to 5.

Step 1: The user sends a dialing request. The dialing request is used to apply for an IP address from the BNG system.

Step 2: The BNG system receives the dialing request and initiates an authentication request to the RADIUS server.

Step 3: The RADIUS server receives the authentication request, generates an authentication result, and returns the authentication result to the BNG system.

Step 4: The BNG system assigns a private network IP address to the user according to a configuration, and sends an accounting packet to the RADIUS server. The accounting packet carries the private network IP address of the user and does not carry a public network IP address.

Step 5: The terminal sends traffic. The traffic is forwarded to the CGN device. The CGN device performs the NAT translation on the traffic, and then sends the translated traffic to the public network side, so that the user accesses the public network. In this step, after receiving the traffic, the CGN device establishes a NAT session based on the received traffic, generates a NAT log based on the NAT session, and sends the NAT log to the log server, so that the log server performs tracing based on the NAT log.

In a NAT scenario, there are two defects when the case 2 is applied.

It may be learned from step 5 that the separate-style CGN device generates the NAT session when being triggered by the receiving of the user traffic, and further generates the NAT log used for the tracing. The separate-style CGN device does not interact with the RADIUS server. Address tracing can only be performed by using the log server. An original RADIUS tracing manner cannot be maintained. The carrier needs to invest in a newly established log server. Constructing an additional log server causes excessively large overheads and excessively high costs.

Figure 3:
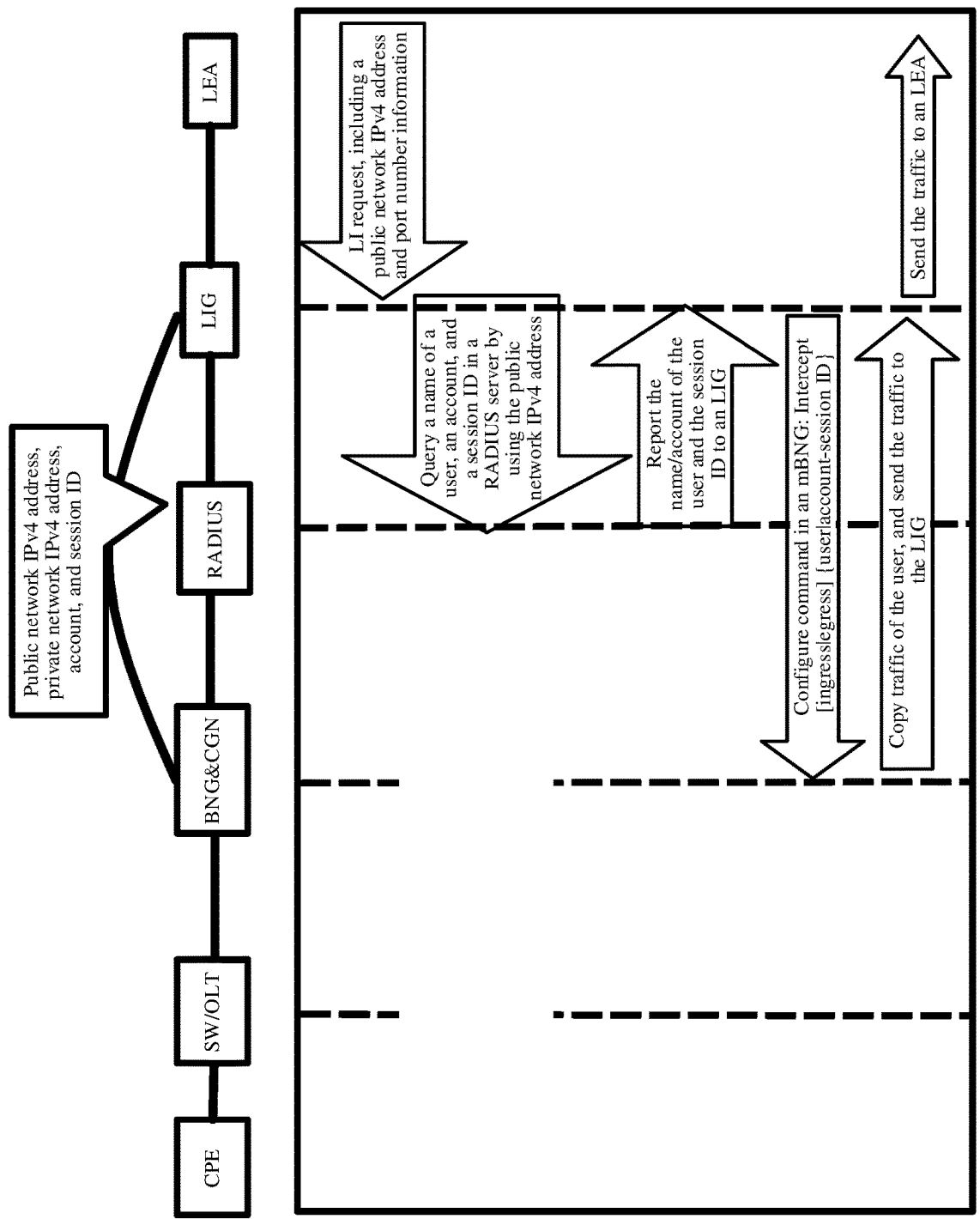
FIG. 3 is a flowchart of interaction between a RADIUS server and a lawful interception platform during tracing according to an embodiment of this application.

In addition, many carriers deploy lawful interception (LI). A lawful interception function is implemented through interacting with a lawful interception device by using the RADIUS server. For example, the lawful interception device includes a lawful interception gateway (LIG) and a law enforcement agency (LEA). For example, with reference to FIG. 3, the LEA interacts with the RADIUS server, and the LEA queries account information of the user based on the public network IP address of the user and the port block. The LIG initiates a lawful interception request to the BNG system based on the account information of the user.

Figure 4:
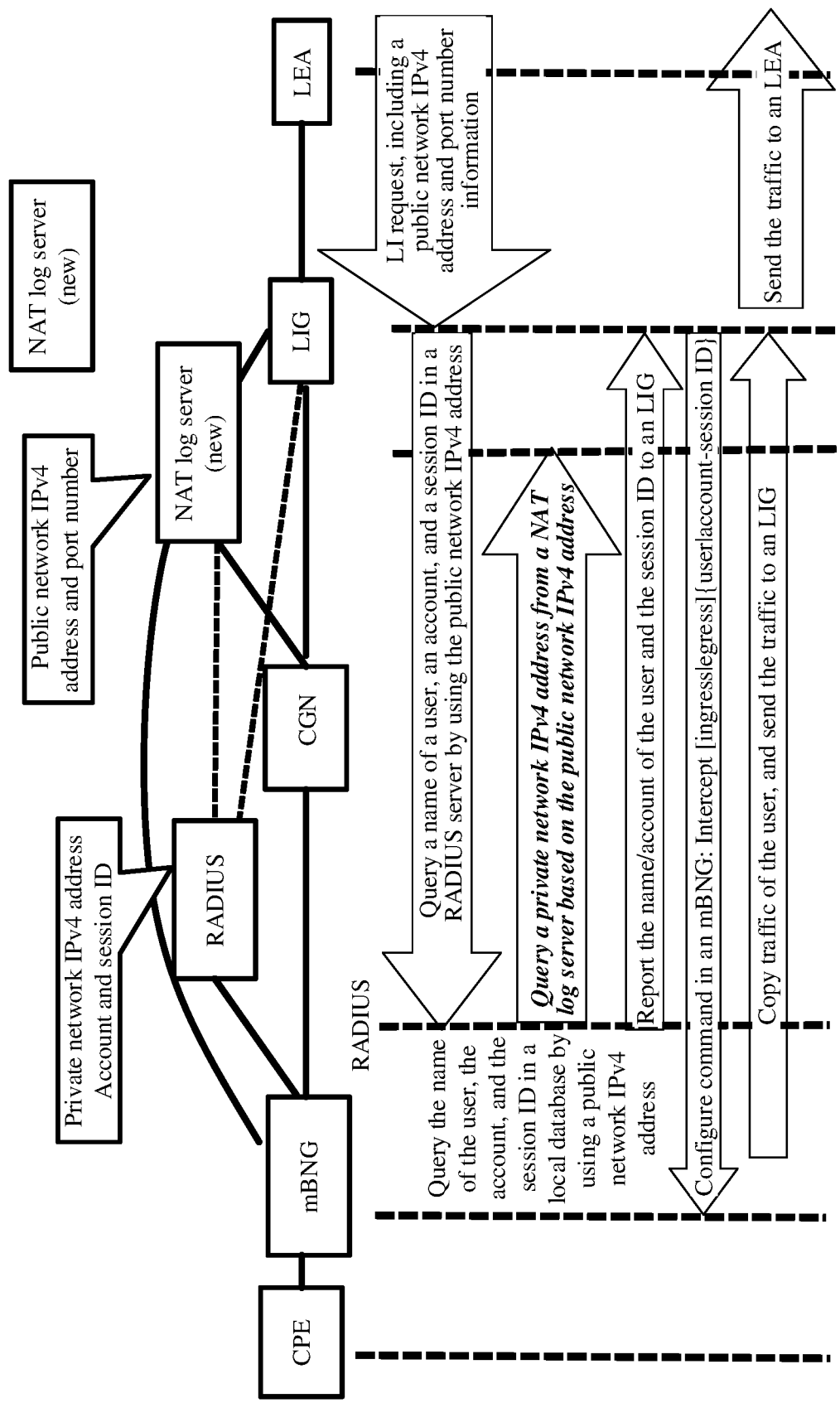
FIG. 4 is a flowchart of interaction between a log server and a lawful interception platform during tracing according to an embodiment of this application.

With reference to FIG. 4, if a manner in which the separate-style CGN device and the log server are used for tracing is used, because the log server instead of the RADIUS server is used for the NAT tracing, the lawful interception device corresponding to the carrier also needs to be newly transformed. As a result, a relatively large quantity of devices of a customer need to be transformed, thereby increasing construction and maintenance costs of the customer. Expenses are undoubtedly very high. In addition, when the user is online, some customers have requirements that the RADIUS server specifies a public network IP address and a port block assigned to the user when the NAT is performed. However, when a manner in which the log server is used for the tracing, the CGN device cannot interact with the RADIUS server. Therefore, the CGN device cannot assign a public network IP address based on the public network IP address specified by the RADIUS server, and the CGN device cannot assign a port block based on the port block specified by the RADIUS server.

In view of the requirements in the case 1 and the case 2, in some embodiments of this application, a solution of performing NAT tracing on the user having the private network IP address is provided. When the CU-separated BNG system is used, the CP device in the BNG system is used as a unified control plane. The CP device manages the UP device, and further manages the separate-style CGN device.

For the case 1, in some embodiments of this application, the separate-style CGN device is used to perform the NAT processing. The separate-style CGN device has higher performance and a larger capacity. This resolves a problem of an inadequate NAT capability of the board-style CGN device, and helps support the Steering scenario with a high requirement for the performance of the CGN device. In addition, this manner is free from a limitation that the BNG device needs additional slots. This is applicable to a scenario of implementing the BNG system by using the mini BNG device.

For the case 2, the RADIUS tracing manner is implemented in some embodiments of this application. A technical problem that it is difficult to perform the tracing by using the RADIUS server when the separate-style CGN device is used is resolved. The address tracing is implemented by using the RADIUS server instead of the log server, to remove a limitation that the carrier adds the log server to the existing network during the tracing. In addition, a limitation that the carrier modifies a LIG device during the tracing is removed, and a large workload and the high costs of modifying the LIG device are reduced. In addition, the CP device can interact with the RADIUS server, to meet the requirements that the RADIUS server specifies the public network IP address and the port range for the user when the NAT is performed.

A management function of the CP device for the CGN device includes but is not limited to the following management functions 1 to 5.

Management function 1: The CP device delivers the assigned IP address (for example, a private network IPv4 address or an IPV6 address) of the user to the CGN device.

Management function 2: When the active CGN device is faulty, the CP device directs the traffic to the standby CGN device.

Management function 3: The CP device synchronizes, to the standby CGN device, a user entity stored in the active CGN device.

Management function 4: After the user is offline, the CP device removes the user entry in the CGN device.

Management function 5: The CP device specifies a range of the assigned port block for the CGN device.

Figure 5:
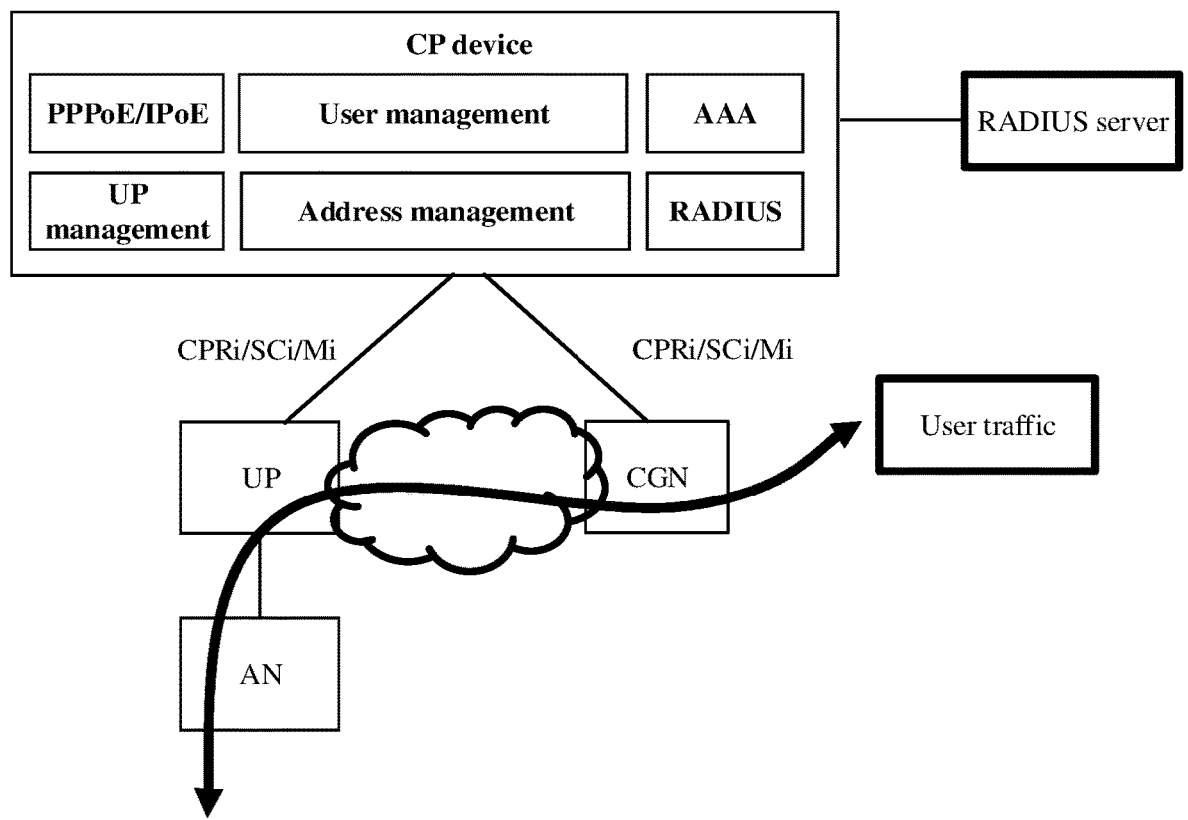
FIG. 5 is a schematic diagram of system architecture according to an embodiment of this application.
Figure 11A:
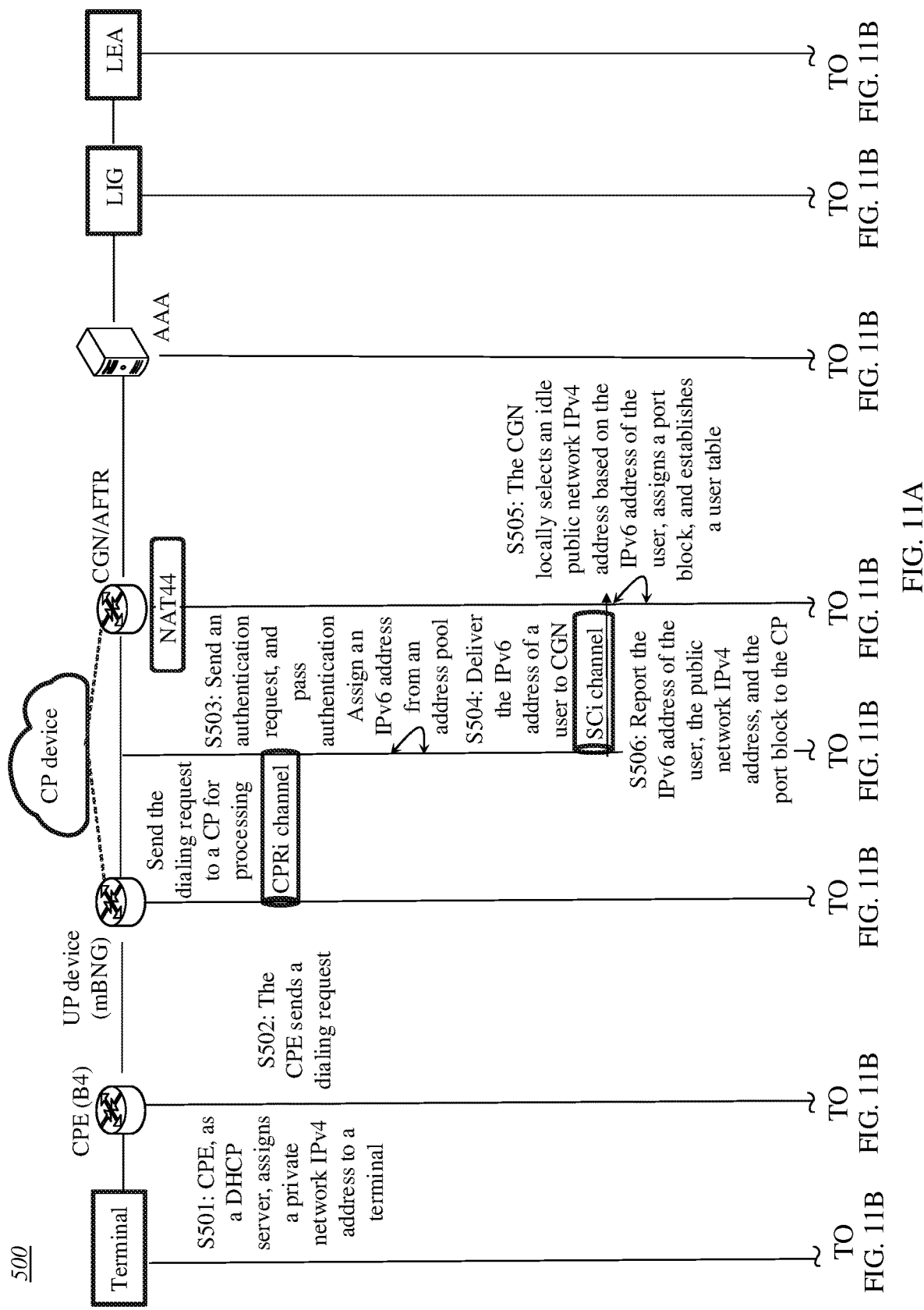
FIG. 11A and FIG. 11B are a flowchart of a communication method 500 in a DS-Lite scenario according to an embodiment of this application.
Figure 11B:
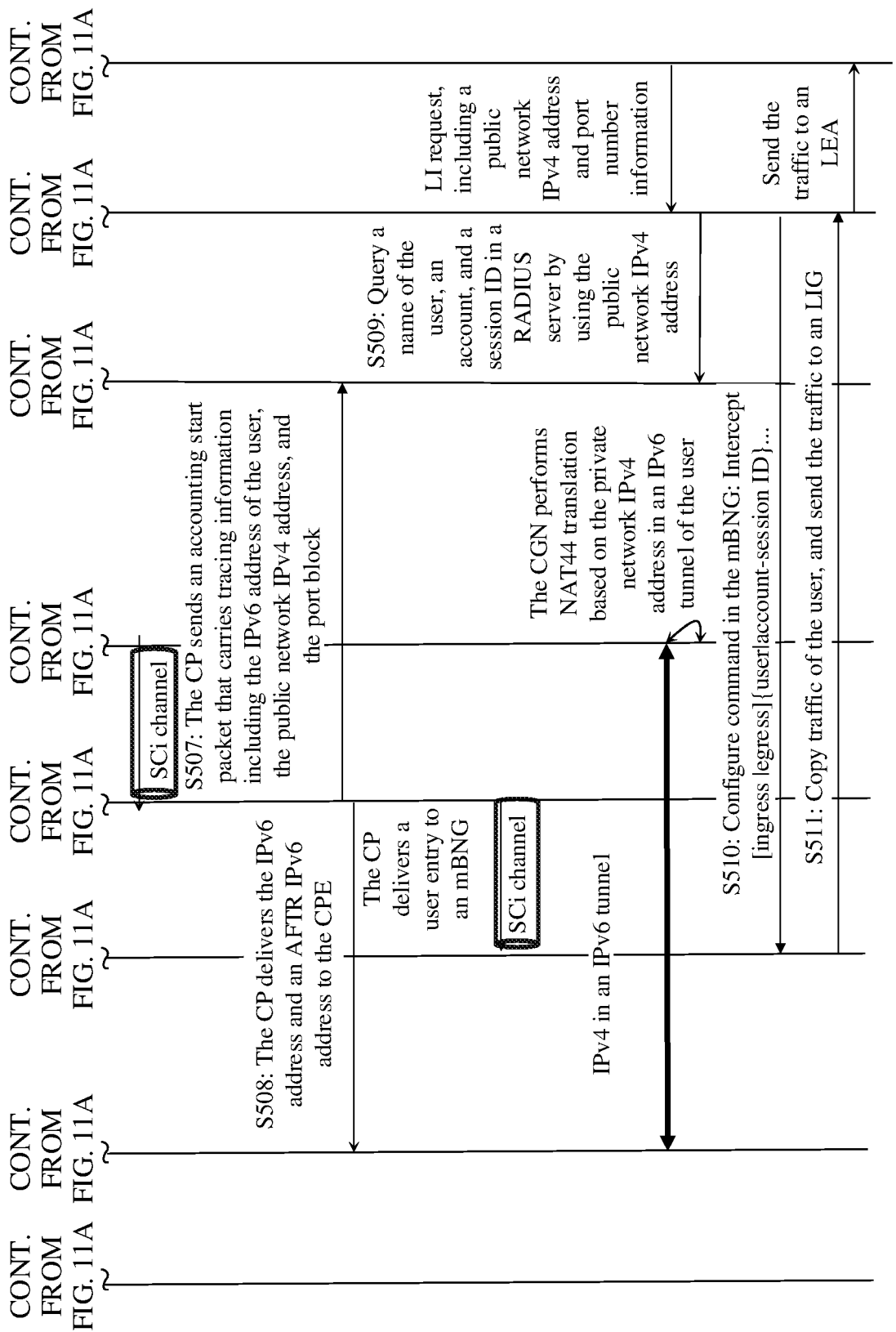
Figure 12:
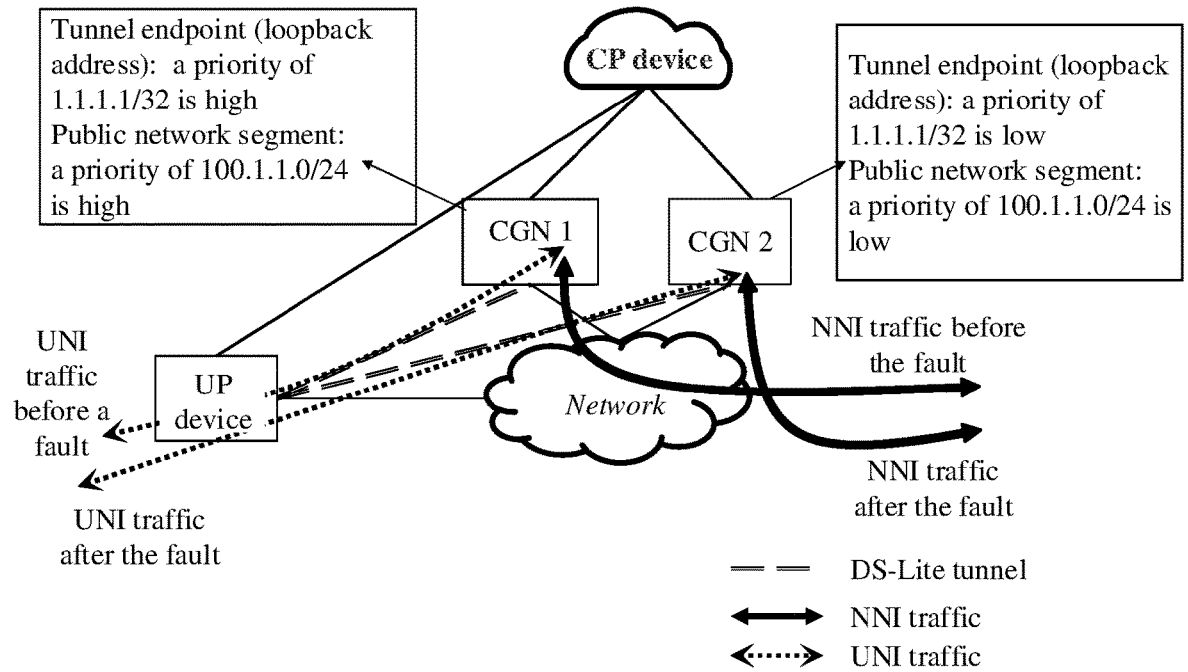
FIG. 12 is a schematic diagram of dual-host standby between CGN devices according to an embodiment of this application.

The following uses system architecture shown in FIG. 5 as an example to describe system architecture by using which the CP device uniformly manages the UP device and the CGN device. A method 200 shown in FIG. 8, a method 300 shown in FIG. 9, a method 400 shown in FIG. 10A and FIG. 10B, and a method 500 shown in FIG. 11A and FIG. 11B are used as examples to describe how the CP device implements the management function 1. FIG. 12 and steps S701 to S708, steps S801 to S804, FIG. 13 and steps S901 to S903 are used as examples to describe how the CP device implements the management function 2. Steps S601 to S605 are used as examples to describe how the CP device implements the management function 3. Steps S203 to S223 are used as examples to describe how the CP device implements the management function 4. Steps S201 to S241 are used as examples to describe how the CP device implements the management function 5.

With reference to FIG. 5, an embodiment of this application provides system architecture. The system architecture includes a CP device, a UP device, an access network device, CPE, and a NAT device.

The CP device is configured to undertake functions of a control plane. In some embodiments, the CP device is a CP device in a CU-separated BNG system, and the CP device undertakes the functions of the control plane in the BNG system. For example, the CP device processes a dialing request of a user based on a dialing protocol. The CP device interacts with authentication, authorization, and accounting (AAA) to perform user authentication, accounting, and authorization. After the user authentication succeeds, the CP device delivers a user entry to a UP device accessed by the user. The UP device generates the user entry of the user and advertises a route. The CP device includes a point-to-point protocol over Ethernet (PPPOE) module or an IP over Ethernet (internet protocol over Ethernet, IPoE) module, a user management module, an AAA module, a UP management module, an address management module, and a RADIUS module.

In some embodiments of this application, the CP device manages the UP device and the NAT device (for example, a separate-style CGN device). For example, the CP device manages the NAT device by using the user management module, and the CP device manages the NAT device by using the UP management module and the user management module. One CP device manages, for example, at least one UP device and at least one NAT device. The CP device is connected to the UP device through a network. The CP device is connected to the NAT device through a network.

Figure 6:
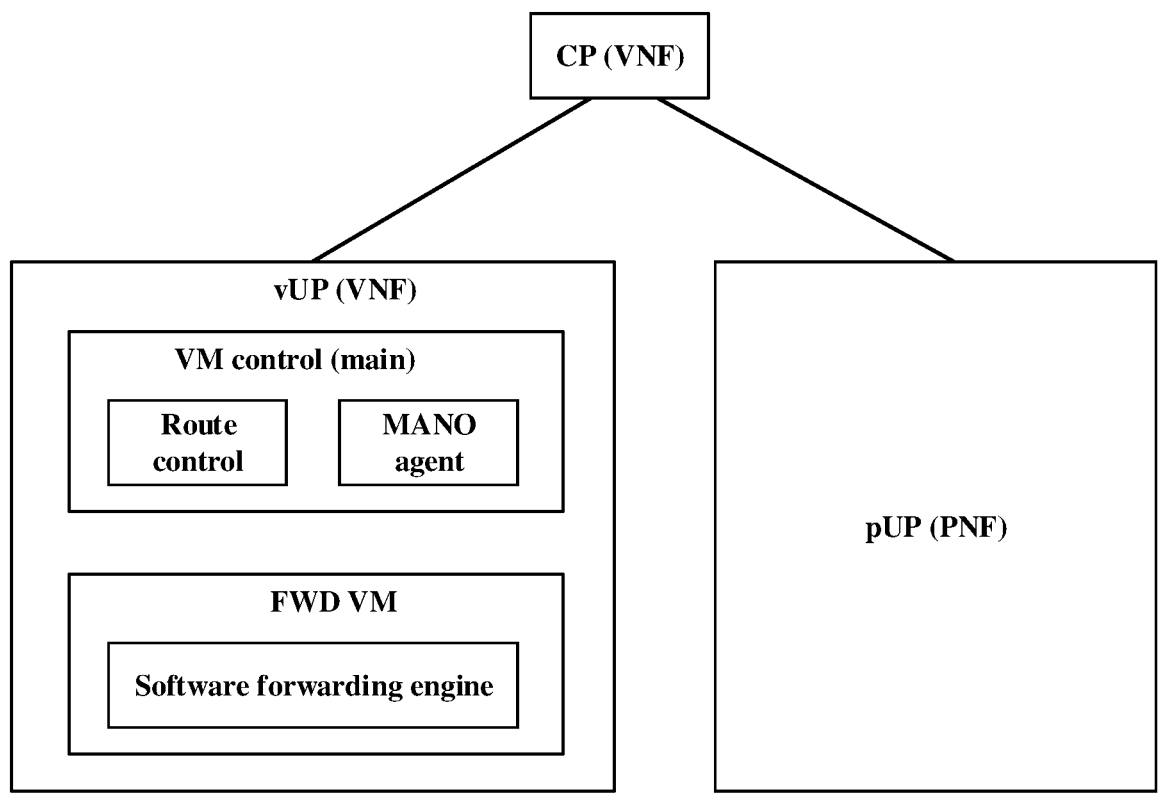
FIG. 6 is a schematic diagram of system architecture according to an embodiment of this application.

The CP device is implemented, for example, by using a virtualization technology. For example, with reference to FIG. 6, the CP device is a VNF. The CP device is a network element virtualized by using an X86 server. A physical entity of the CP device is the X86 server.

The UP device is configured to undertake functions of a user plane. In some embodiments, the UP device is a UP device in the CU-separated BNG system, and the UP device undertakes the functions of the user plane in the BNG system. When the user requests to be online, the UP device sends, by using a service channel, a dialing request of the user to the CP device for processing. After processing the dialing request, the CP device delivers a user entry to the UP device. The UP device receives the user entry delivered by the CP device. The UP device locally generates the user entry. The UP device performs related service policy execution and traffic forwarding based on the user entry. In addition, the UP device advertises the route. The UP device has a plurality of implementations. The UP device is connected to the access network device through a network.

In some embodiments, the UP device is implemented by using a virtualization technology. For example, with reference to FIG. 6, the UP device is a VNF. The UP device is a network element virtualized by using an X86 server. Hardware of the UP device is the X86 server. When the UP device is implemented by using the virtualization technology, the UP device is, for example, referred to as a vUP device (VNF). In some other embodiments, the UP device is a network device, and the UP device is a PNF. For example, the UP device is any one of a hardware mini BNG device or a frame-shaped BNG system. When the UP device is implemented by using the network device, the UP device is, for example, referred to as a pUP device (PNF). The access network device includes but is not limited to any one of an access node (access node, AN) device, an SW, or an OLT. The access network device is connected to the CPE and the UP device through a network. The access network device is configured to aggregate the CPE to the UP device. The access network device is further configured to: forward a layer-2 packet, and perform virtual LAN (VLAN) or QinQ isolation for the user. Herein, QinQ is also referred to as a stacked VLAN or a double VLAN.

The CPE is a residential gateway (RGW, also referred to as a residential terminal) in carrier networking. The CPE is configured to access a personal computer (PC) and a mobile phone in home. The CPE usually performs NAT processing, and assigns private network IP addresses to the CP device and the mobile phone in home. In addition, the CPE further performs PPPOE protocol and IPoE protocol dialing, obtains an IP address from the BNG system, and performs network access based on the obtained IP address.

The NAT device is configured to perform NAT processing. For example, the NAT device translates a private network IP address of the user to a public network IP address and a port block. For another example, the NAT device translates an IPV6 address of the user to a public network IP address and a port block. In some embodiments, the NAT device is a CGN device. For example, the NAT device is a separate-style CGN device. The separate-style CGN device has a plurality of implementations. For example, the separate-style CGN device is a hardware device. For example, the separate-style CGN device is a network device. For another example, the separate-style CGN device is implemented by using the virtualization technology. For example, the separately-style CGN device is a network element virtualized by using the X86 server. In some other embodiments, the NAT device is another device with a NAT processing function other than the CGN device.

Figure 7:
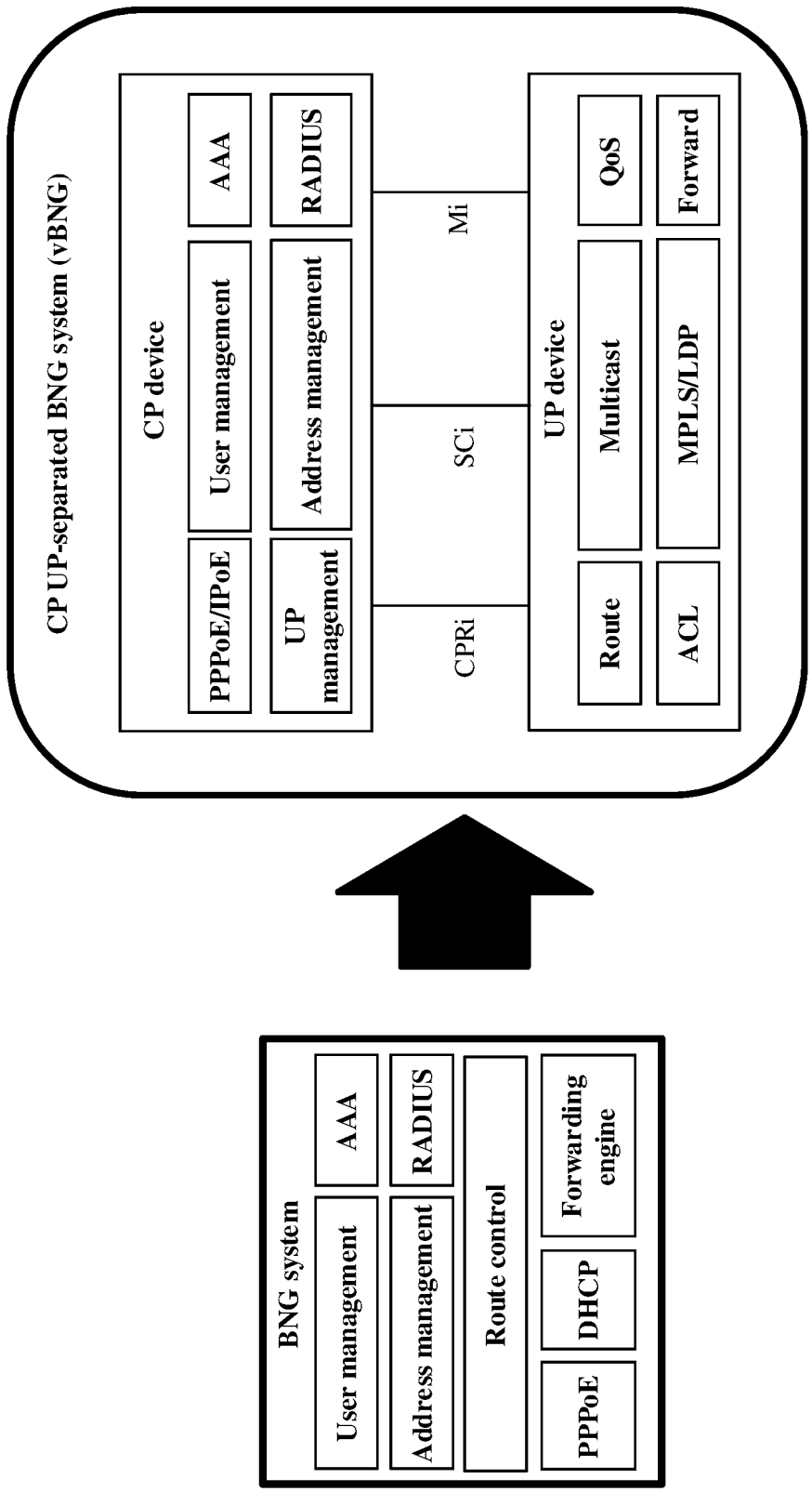
FIG. 7 is a schematic diagram of system architecture according to an embodiment of this application.

With reference to FIG. 7, there are three types of interfaces between the CP device and the UP device. The three types of interfaces are respectively a control packet redirect interface (CPRi), a management interface (Mi), and a state control interface (SCi).

The CPRi is implemented by using a Vxlan generic protocol encapsulation (Vxlan-GPE) interface. The UP device receives an access packet of the user. The UP device encapsulates the access packet based on a packet encapsulation format corresponding to the CPRi, and sends the encapsulated access packet to the CP device for processing.

The Mi is implemented by using an XML network configuration protocol (Netconf) interface. The CP device delivers a configuration to the UP device by using the Mi. The UP device reports a running status of the UP device by using the Mi.

The SCi is implemented by using a control plane and user plane separated protocol (CUSP) interface. The CP device processes the access packet of the user, and completes protocol interaction of the user. After the user is online, the CP device delivers, by using the SCi, the user entry of the user to the UP device accessed by the corresponding user.

In some embodiments of this application, the CP device manages the CGN device also by using the CPRi, the Mi, and the SCi. For example, an active CGN device reports the user entry to the CP device by using the SCi. The CP device delivers the user entry to a standby CGN device by using the SCi.

In some embodiments, a communications system includes a gateway system. The gateway system is a BNG system or a BRAS system. A CP in the BNG system or a CP in the BRAS system is selected to implement a solution in this embodiment, to help multiplex network architecture of the BNG system or the BRAS system, thereby reducing implementation complexity. Optionally, the CP device is implemented by using a CP in another CU-separated communications system other than the BNG system and the BRAS system. For example, the CP device is implemented by using a CP in a CU-separated serving gateway (S-GW). For another example, the CP device is implemented by using a CP in a CU-separated packet data network gateway (PDN gateway, PGW). For another example, the CP device is implemented by using an access and mobility management function (AMF) network element. For another example, the CP device is implemented by using a session management function (SMF) network element. For another example, the CP device is implemented by using an access gateway function (AGF) network element in a WT-456 fixed-mobile converged communications system.

The following briefly describes how to implement embodiments of this application based on the system architecture shown in FIG. 5 by using an example in which the UP device is a mini BNG device, the NAT device is a separate-style CGN device, and the IP address assigned by the CP device is a private network IPv4 address.

The CP device manages both the mini BNG device and the separate-style CGN device. The user is online by using the mini BNG device. After the CP device assigns the private network IPV4 address to the user in response to an online request, the CP device delivers the private network IPv4 address of the user to the separate-style CGN device. The separate-style CGN device assigns, to the user from a local public network address pool, a public network IPv4 address and a port block that correspond to a private network IPv4 address. The separate-style CGN device reports the public network IPv4 address and the port block to the CP device. The CP device adds the public network IPv4 address of the user and the port block to an accounting packet, and reports the accounting packet to the AAA, to implement RADIUS tracing of the user.

Figure 8:
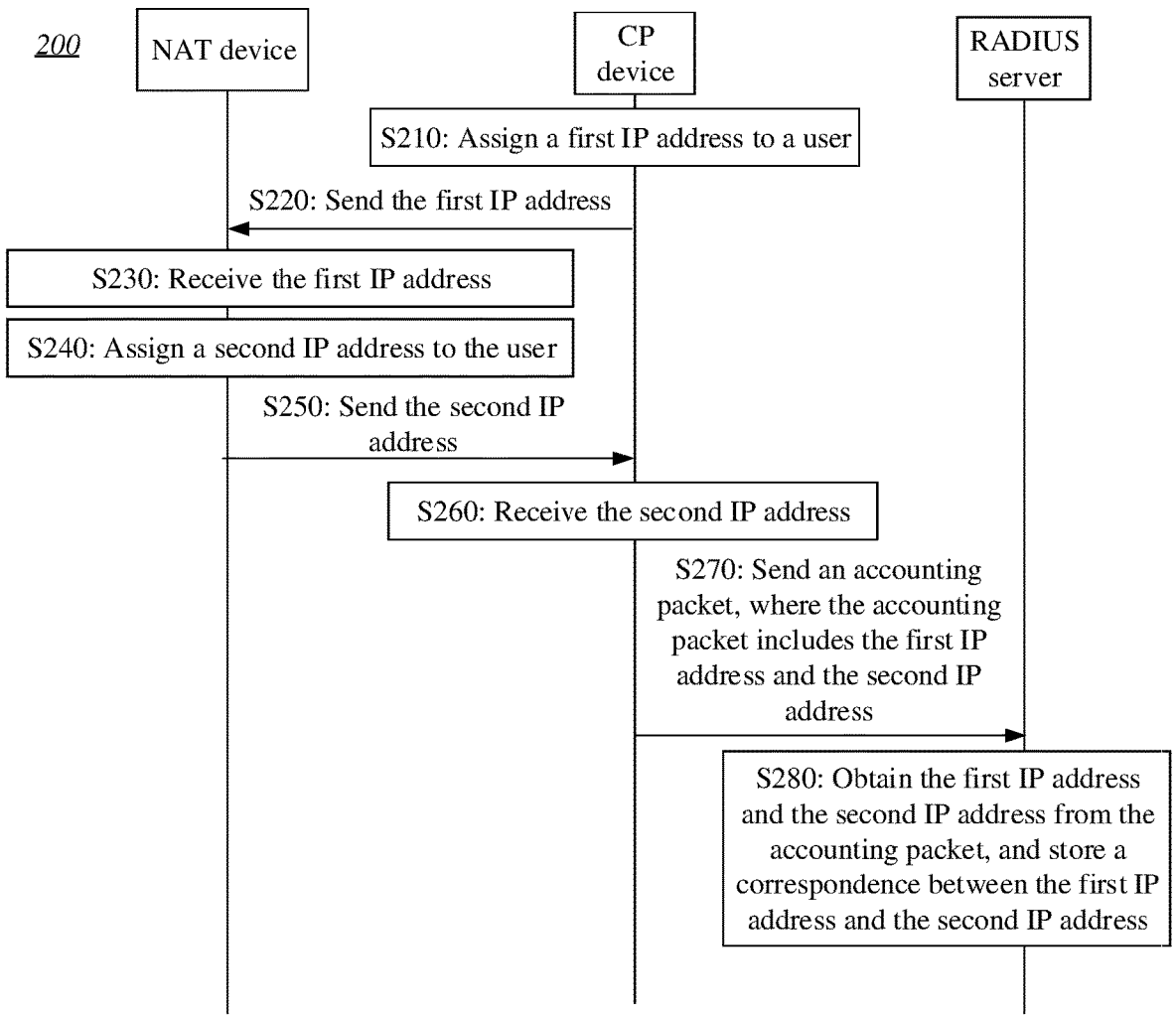
FIG. 8 is a flowchart of a communication method 200 according to an embodiment of this application.

FIG. 8 is a flowchart of a communication method 200 according to an embodiment of this application. Optionally, the method 200 is performed by a CP device, a NAT device, and a RADIUS server.

For example, the method 200 includes steps S210 to S280.

S210: The CP device assigns a first IP address to a user.

In this embodiment, the CP device and the NAT device assign different IP addresses to the same user. For distinguished description, an IP address assigned to the user by the CP device is referred to as the first IP address, and an IP address assigned to the user by the NAT device is referred to as a second IP address. The first IP address and the second IP address are also referred to as the IP addresses of the user.

S220: The CP device sends the first IP address to the NAT device.

In some embodiments, the first IP address includes at least one of a private network IPv4 address or an IPV6 address.

Optionally, the first IP address is a private network IPv4 address. For example, in a NAT44 scenario, the CP device assigns the private network IPv4 address to the user. For a specific processing procedure of the NAT44 scenario, refer to the following method 300 shown in FIG. 9 or the method 400 shown in FIG. 10A and FIG. 10B. The CP device assigns the private network IPv4 address and delivers the private network IPv4 address to the NAT device. This helps implement RADIUS tracing in the NAT44 scenario. Optionally, the first IP address is the IPV6 address. For example, in a DS-Lite scenario, the CP device assigns the IPV6 address to the user. For a specific processing procedure of the DS-Lite scenario, refer to the following method 500 shown in FIG. 11A and FIG. 11B. The CP device assigns the IPV6 address and delivers the IPV6 address to the NAT device. This helps implement RADIUS tracing in a dual-stack network such as the DS-Lite scenario. Optionally, the first IP address includes a private network IPV4 address and an IPV6 address.

There are a plurality of manners in which the CP device delivers the IP address to the NAT device. In some embodiments, the CP device sends the first IP address to the NAT device based on the CUSP. For example, the CP device generates and sends a CUSP message. The CUSP message includes the first IP address. In some other embodiments, the CP device sends the first IP address to the NAT device based on the PFCP. For example, the CP device generates and sends a PFCP message. The PFCP message includes the first IP address.

S230: The NAT device receives, from the CP device, the first IP address that is assigned by the CP device to the user.

S240: The NAT device assigns the second IP address to the user.

The second IP address is a public network IP address. For example, the second IP address is a public network IPv4 address. In some embodiments, the NAT device selects an unoccupied public network IP address from an address pool as the assigned IP address.

S250: The NAT device sends the second IP address to the CP device.

In some embodiments, the NAT device sends a correspondence between the first IP address and the second IP address to the CP device, so that the CP device learns that the public network IP address reported by the NAT device is an IP address that is assigned by the NAT device to which user.

In some embodiments, after the NAT device receives the first IP address delivered by the CP device, the NAT device not only assigns a public network IP address to the user, but also assigns a port block to the user. Correspondingly, the NAT device not only reports the public network IP address to the CP device, but also reports the port block assigned to the user. The port block includes at least one port number.

It can be learned from step S230 to step S250 that, in this embodiment, a manner of triggering the NAT device to assign the public network IP address is different from a related technology. The assignment is not triggered by an event of receiving traffic, but is triggered by an event that the CP device delivers the IP address.

In some embodiments, the NAT device locally stores the assigned second IP address and the assigned port block. For example, the NAT device generates and stores information about the user. The information about the user includes a correspondence among the first IP address, the second IP address, and the port block. A form of the information about the user is, for example, an entry in a user table. For example, the NAT device creates a user entry in the user table, and stores the correspondence among the first IP address, the second IP address, and the port block in the user entry. The user entry that stores the correspondence among the first IP address, the second IP address, and the port block is the information about the user. In some embodiments, in addition to the correspondence among the first IP address, the second IP address, and the port block, the local user entry of the NAT device further includes other information about the user, for example, a user identity.

The NAT device locally stores the information about the user. Therefore, in a subsequent data packet forwarding phase, a forwarding entry is generated based on the pre-stored information about the user. In the data packet forwarding phase, when receiving an uplink data packet, the NAT device identifies a source IP address and a source port number of the data packet, searches for the information about the user based on the source IP address, obtains an IP address corresponding to the source IP address and a port number corresponding to the source port number in the information about the user, translates the source IP address to the found IP address, and translates the source port number to the found port number, to perform NAT. In some embodiments, the source IP address of the data packet is the private network IPv4 address (the first IP address), and the found IP address is the second IP address. In other words, the private network IPv4 address pre-assigned by the CP device is translated to the public network IP address pre-assigned by the NAT device. In some other embodiments, for example, in the DS-Lite scenario, the data packet is in an IPV4-in-IPv6 form. The data packet includes two IP headers. An IP header of an outer layer is an IPV6 header, and an IP header of an inner layer of the data packet is an IPV4 header. The IPV6 header of the outer layer belongs to a tunnel header. The source IP address in the IPV6 header of the outer layer is an IPV6 address of CPE. The IPV6 address of the CPE is the first IP address assigned by the CP device.

The source IP address in the IPV4 header of the inner layer is a private network IPV4 address assigned by the CPE to a terminal. The NAT device translates the private network IPv4 address in the IPv4 header to a public network IPv4 address. In other words, the private network IPv4 address pre-assigned by the CPE is translated to the public network IP address pre-assigned by the NAT device.

In some embodiments, the NAT device sends, to the CP device, the local information about the user in the NAT device, and the CP device receives the information about the user from the NAT device. In this manner, the local user entry in the NAT device is synchronized to the CP device.

S260: The CP device receives the second IP address from the NAT device. The second IP address is a public network IP address that is assigned by the NAT device to the user.

There are a plurality of manners in which the NAT device reports the IP address and the port block to the CP device. In some embodiments, the NAT device sends the second IP address and the port block to the CP device based on the CUSP. For example, the NAT device generates and sends a CUSP message. The CUSP message includes the second IP address and the port block. In some other embodiments, the NAT device sends the second IP address and the port block to the CP device based on the PFCP. For example, the NAT device generates and sends a PFCP message. The PFCP message includes the second IP address and the port block.

In some embodiments, the CP device locally stores the assigned second IP address and the assigned port block. For example, the CP device generates and stores the information about the user. The information about the user includes the correspondence among the first IP address, the second IP address, and the port block. A form of the information about the user is, for example, an entry in the user table. For example, the CP device creates a user entry in the user table, and stores the correspondence among the first IP address, the second IP address, and the port block in the user entry. The user entry that stores the correspondence among the first IP address, the second IP address, and the port block is the information about the user. In some embodiments, the local user entry of the CP device further includes authorization information of the user. The authorization information of the user is, for example, quality of service (Qos) information, access control list (ACL) information, and a media access control (Client MAC) address.

S270: The CP device sends an accounting packet to the RADIUS server.

When generating the accounting packet, the CP device adds, to the accounting packet, the public network IP address (the second IP address) reported by the NAT device and the IP address (the first IP address) assigned by the CP device, so that the accounting packet includes the first IP address and the second IP address. In addition, when the NAT device reports the port block to the CP device, the CP device further adds, to the accounting packet, the port block reported by the NAT device, so that the accounting packet includes the first IP address, the second IP address, and the port block.

The accounting packet includes but is not limited to at least one of an accounting start packet or an accounting end packet. The accounting start packet is used to request the RADIUS server to start accounting. The accounting end packet is used to request the RADIUS server to end accounting. In some embodiments, the accounting packet further includes the port block. In some embodiments, the accounting packet further includes at least one of a user online time or a user offline time. The user online time is, for example, an accounting start time in the accounting start packet. The user offline time is, for example, an accounting end time in the accounting end packet. The first IP address, the second IP address, the port block, the user online time, or the user offline time may be referred to as NAT tracing information that is of the user and that is carried in the accounting packet. In some embodiments, the accounting packet includes at least one RADIUS attribute field. The RADIUS attribute field includes at least one of the first IP address, the second IP address, the port block, the user online time, or the user offline time.

The CP device sends the accounting packet, to report the NAT tracing information (the first IP address, the second IP address, the port block, the user online time, and the user offline time) to the RADIUS server.

S280: The RADIUS server obtains the first IP address and the second IP address from the accounting packet, and stores a correspondence between the first IP address and the second IP address.

After receiving the accounting packet, the RADIUS server executes an accounting procedure, and locally stores the NAT tracing information carried in the accounting packet. When the tracing needs to be performed based on the first IP address, a tracing request is sent to the RADIUS server. The tracing request includes the second IP address. The RADIUS server receives the tracing request, obtains the second IP address from the tracing request, and queries the NAT tracing information based on the second IP address to obtain the first IP address, to implement RADIUS tracing.

In the method provided in this embodiment, the CP device delivers the assigned IP address to the NAT device. Under a trigger condition of receiving the IP address delivered by the CP device, the NAT device assigns, to the user, a public network IP address that corresponds to the IP address delivered by the CP device, and reports the public network IP address to the CP device. The CP device adds, to the accounting packet based on the public network IP address reported by the NAT device, the IP address assigned by the CP device and the public network IP address assigned by the NAT device, and sends the accounting packet to the RADIUS server, to report the IP address assigned by the CP device and the public network IP address assigned by the NAT device to the RADIUS server, thereby performing NAT tracing on the RADIUS server. Because the NAT tracing uses a RADIUS tracing manner, tracing can be performed through multiplexing the RADIUS server. This manner is free from a limitation that a log server needs to be established for the tracing, to reduce the tracing costs. In addition, this manner is applicable to a scenario in which the NAT device is implemented by using a separate-style NAT device. This helps resolve problems such as insufficient UP slots and a poor NAT processing capability when the NAT device is implemented by using a board-style NAT device such as a service board.

In some embodiments, when the user is offline, the CP device removes the user entry stored in the NAT device, to implement the foregoing related management function 4. For example, the method 200 specifically includes the following steps S203 to S223.

S203: If the user is offline, the CP device generates a delete message, and sends the delete message to the NAT device.

The delete message is used to indicate the NAT device to delete the information that is about the user and that is stored in the NAT device. The delete message is, for example, a CUSP message.

S213: The NAT device receives the delete message from the CP device.

S223: The NAT device deletes the information about the user in response to the delete message.

The CP device indicates the NAT device to delete the information about the user when the user is offline, and releases, in time, storage space that is occupied in the NAT device by the information about the offline user, thereby saving a storage resource of the NAT device and avoiding a resource depletion problem of the NAT device.

In addition, in some embodiments, if the user is offline, the CP device deletes the information that is about the user and that is stored in the CP device, so that the information that is about the user and that is stored in the NAT device and the information that is about the user and that is stored in the CP device are both removed. For example, when a form of the information about the user is a user entry, the NAT device deletes a user entry corresponding to the offline user from the NAT device, and the CP device deletes a user entry corresponding to the offline user from the CP device, to complete an action of removing the user entries from both the NAT device and the CP device. The CP device deletes the locally stored information about the user when the user is offline, and releases, in time, the storage space that is occupied in the CP device by the information about the offline user, thereby saving a storage resource of the CP device and avoiding a resource depletion problem of the CP device.

In some embodiments, the RADIUS server is used to specify a range of the port block during the NAT, to implement the foregoing related management function 5. For example, the method 200 specifically includes the following steps S201 to S241.

S201: The RADIUS server obtains a port block set, and sends the port block set to the CP device.

The port block set is used as a value range of the port block assigned by the NAT device. The port block set includes at least one port block.

S211: The CP device receives the port block set from the RADIUS server.

S221: The CP device sends the port block set to the NAT device.

For example, when delivering the first IP address to the NAT device, the CP device further delivers the port block set to the NAT device, to transmit both the first IP address and the port block set to the NAT device.

S231: The NAT device receives the port block set from the CP device.

S241: The NAT device assigns the port block in the port block set to the user.

For example, the NAT device selects an unoccupied port block from the port block set, and assigns the selected port block to the user.

In a scenario in which the carrier needs to specify a range of the port block of the user, the RADIUS server delivers the port block set to the CP device, and then the CP device delivers the port block set to the NAT device, to specify the NAT device to assign the port block in the port block set, thereby meeting a requirement for specifying the range of the port block during the NAT. Particularly, the CP delivers, to the NAT device, the IP address and the port block set specified by the RADIUS server. In this way, a process of specifying the range of the port block by the RADIUS server and a process of triggering the NAT device to assign the public network IP address can be simultaneously performed, thereby reducing communication overheads and implementation complexity.

In some embodiments, the first IP address in the foregoing method 200 is a private network IP address. Specifically, when the user is online, the CP device assigns the private network IP address of the user. In addition, the CP device delivers the private network IP address and related information of the user to the CGN device. After receiving the private network IP address and the related information from the CP device, the CGN device assigns the public network IP address and the port block to the user, and reports the public network IP address and the port block to the CP device. The CP device adds the public network IP address of the user and the port block to the accounting packet, and sends the accounting packet to the RADIUS server, to perform tracing by using the RADIUS server.

Figure 9:
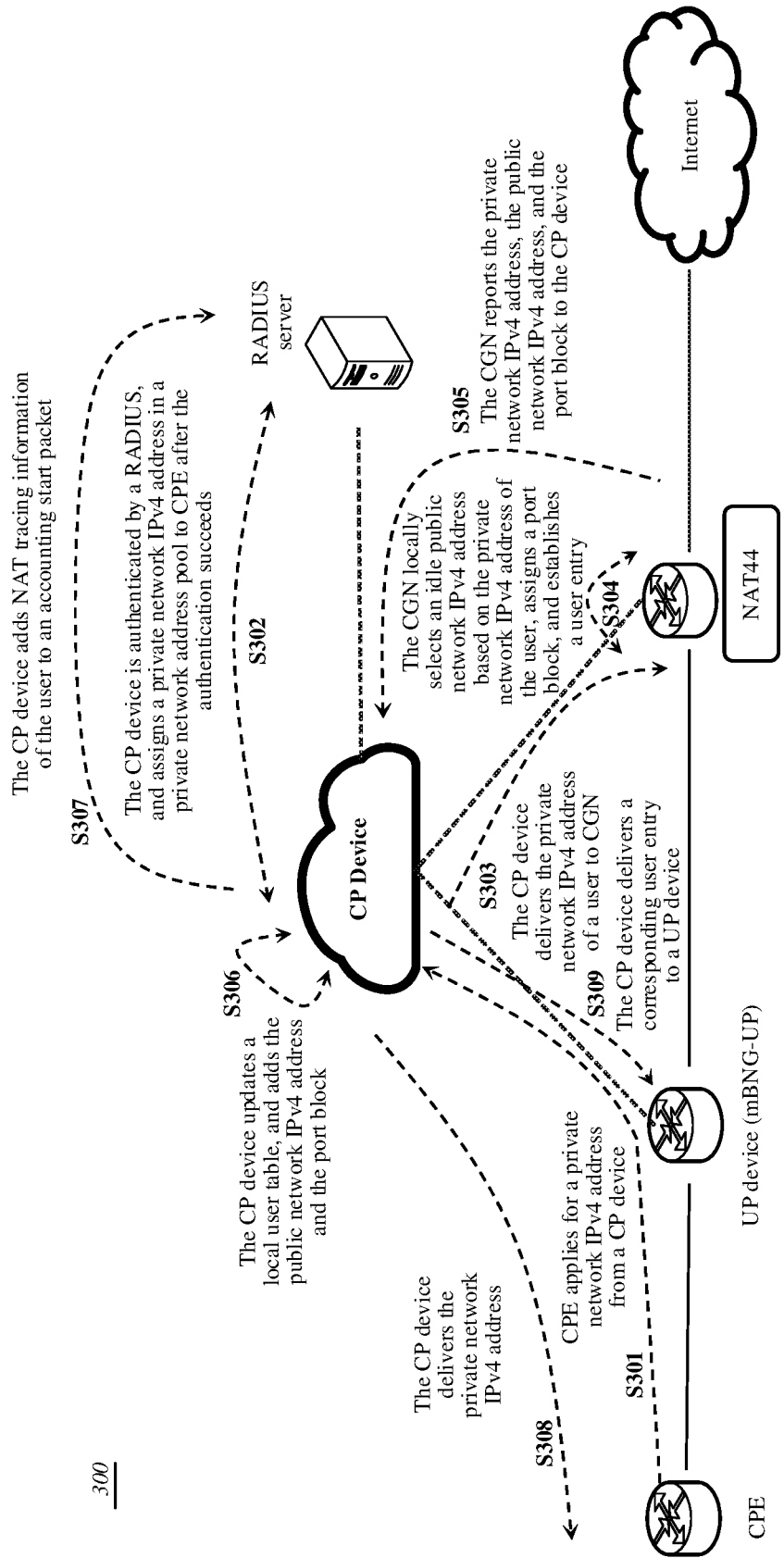
FIG. 9 is a flowchart of a communication method 300 in a NAT44 scenario according to an embodiment of this application.

With reference to FIG. 9, the method 300 shown in FIG. 9 is an example of performing the method 200 in a NAT44 scenario. In other words, the method 300 shown in FIG. 9 describes how to perform tracing by using a RADIUS server in a NAT44 scenario when a separate-style CGN device is used. In the method 300 shown in FIG. 9, a first IP address is a private network IPv4 address, a second IP address is a public network IPv4 address, a communications system is a BNG system, a NAT device is a separate-style CGN device, and information about a user is stored in a user entry in a user table.

The method 300 shown in FIG. 9 includes the following steps S301 to S309.

S301: The user sends a dialing request. The dialing request is used to apply for an IP address from a BNG system.

S302: A CP device receives the dialing request. The CP device initiates an authentication request to a RADIUS server when the dialing request is triggered. After authentication of the RADIUS server succeeds, the CP device assigns a private network IPV4 address from a private network address pool to the user.

S303: The CP device delivers the private network IPV4 address of the user to the separate-style CGN device.

S304: The separate-style CGN device receives the private network IPv4 address of the user from the CP device. The separate-style CGN device locally selects an idle public network IPv4 address and a port block based on the private network IPv4 address of the user, and assigns the selected public network IPv4 address and the selected port block to the user. In addition, the separate-style CGN device adds a user entry to the user table. The newly added user entry stores a correspondence among the private network IPv4 address, the public network IPv4 address, and the port block.

S305: The separate-style CGN device reports the private network IPV4 address of the user, the public network IPV4 address, and the port block to the CP device.

S306: The CP device receives the private network IPV4 address of the user, the public network IPv4 address, and the port block from the separate-style CGN device. The CP device updates a local user table, and adds a user entry to the user table. The newly added user entry stores the public network IPv4 address and the port block.

S307: The CP device sends an accounting packet. The accounting packet is, for example, an accounting start packet. The accounting packet carries NAT tracing information of the user. The NAT tracing information includes the private network IPv4 address assigned by the CP device, the public network IPV4 address assigned by the CGN, and the port block assigned by the CGN.

S308: The CP device delivers the private network IPv4 address to the user.

S309: The CP device delivers the corresponding user entry to a UP device.

Figure 10A:
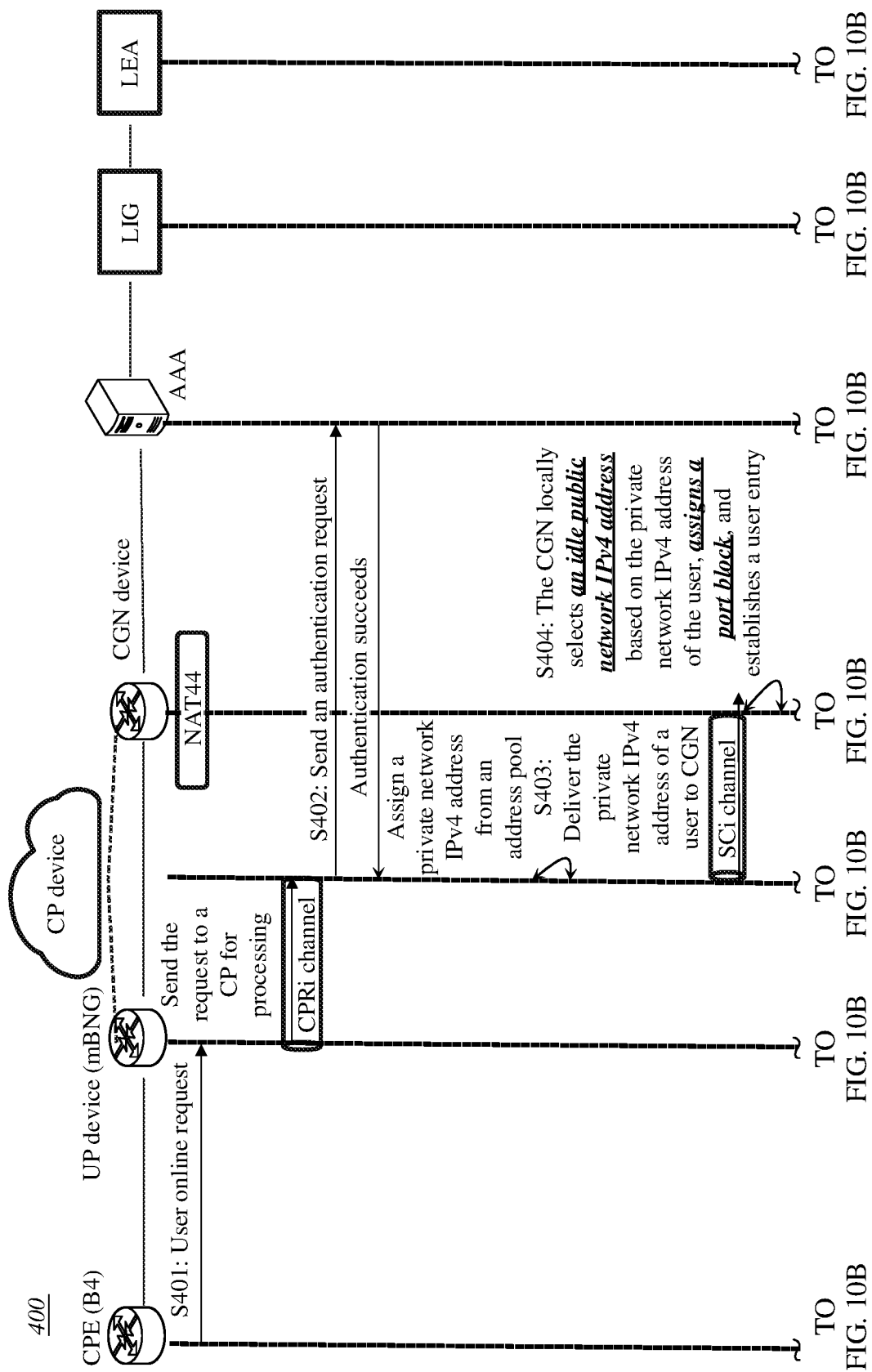
FIG. 10A and FIG. 10B are a flowchart of a communication method 400 in a NAT44 scenario according to an embodiment of this application.
Figure 10B:
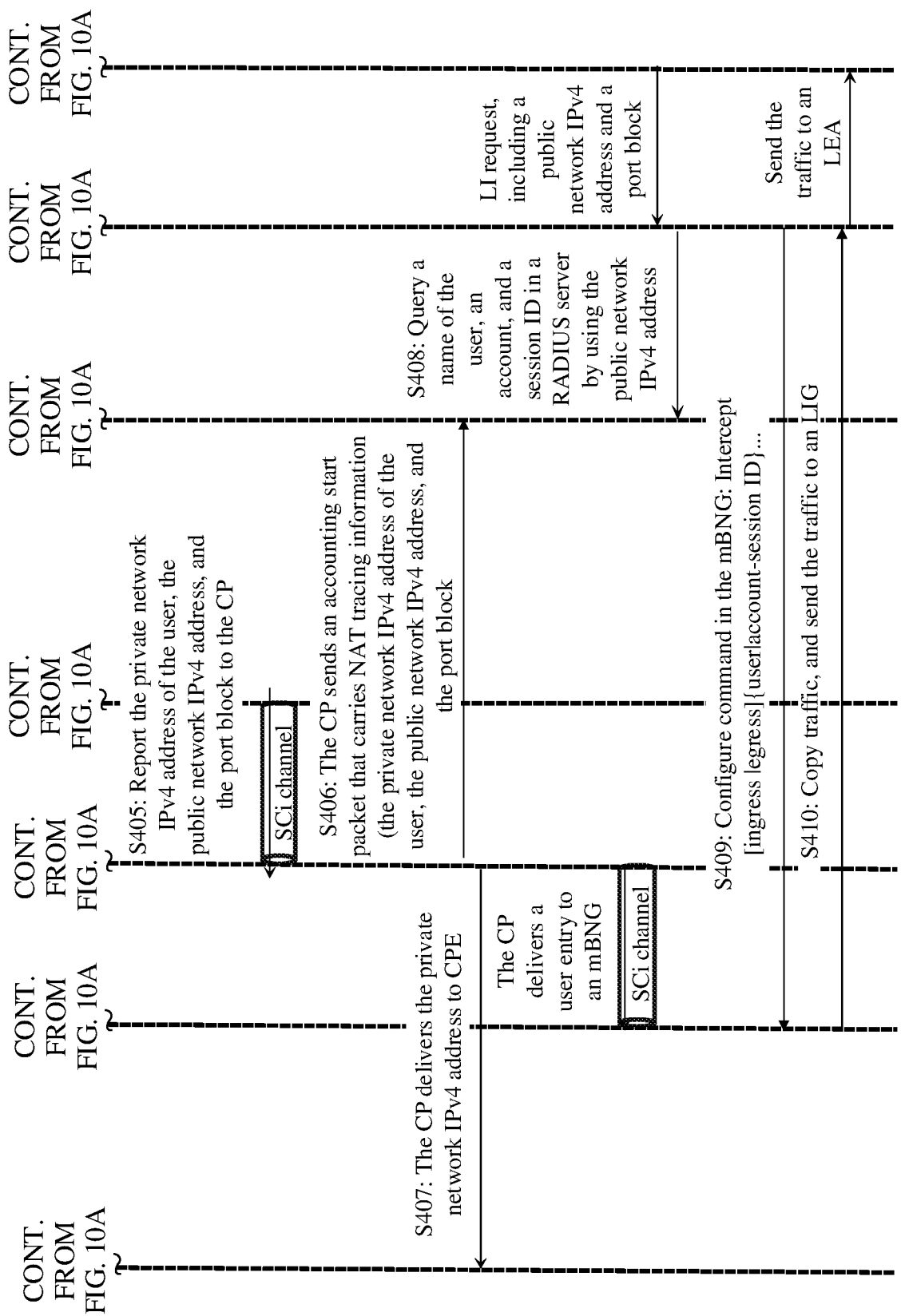

With reference to FIG. 10A and FIG. 10B, the method 400 shown in FIG. 10A and FIG. 10B is an example of describing the method 300. In the method 400, a UP device in a BNG system is a mini BNG device (that is, an mBNG in FIG. 10A and FIG. 10B). An action that a CP device delivers a private network IPv4 address to a CGN device is implemented by using an interface such as an SCi channel. An action that the CGN device reports the private network IPv4 address, a public network IPV4, and a port block to the CP device is implemented by using an interface such as the SCi channel. In addition, the method 400 further relates to an interaction process with a lawful interception device (an LIG and an LEA). The method 400 in a NAT44 scenario shown in FIG. 10A and FIG. 10B includes the following steps S401 to S410.

S401: CPE sends a dialing request. The dialing request is also referred to as a user online request. The dialing request is, for example, a PPPOE dialing request or a dynamic host configuration protocol (DHCP) dialing request. The CP device broadcasts the dialing request to, for example, a layer-2 network. The mini BNG device (the UP device) receives the dialing request. The mini BNG device (the UP device) sends the dialing request to the CP device through a CPRi channel.

S402: The CP device sends an authentication request to a RADIUS server. After authentication of the RADIUS server succeeds, the RADIUS server assigns the private network IPv4 address to a user.

S403: The CP device delivers the private network IPV4 address of the user to the CGN device through the SCi channel.

S404: The CGN device assigns a public network IPV4 address and a port block. In addition, the CGN device adds a user entry to a user table. The newly added user entry stores a correspondence among the private network IPV4 address, the public network IPv4 address, and the port block.

S405: The CGN device reports the private network IPV4 address of the user, the public network IPv4 address, and the port block to the CP device through an SCi.

S406: The CP device sends an accounting start packet to the RADIUS server. The accounting start packet carries NAT tracing information of the user. The NAT tracing information includes the private network IPv4 address, the public network IPv4 address, and the port block.

S407: The CP device delivers the private network IPv4 address to the CPE. In addition, the CP device delivers the user entry to the mini BNG device.

S408: The LIG requests account information of the user from the RADIUS server based on the public network IPV4 address and the port block. The account information of the user includes but is not limited to at least one of a name of the user, an account of the user, and a session ID. Specifically, with reference to FIG. 10A and FIG. 10B, the LEA sends a lawful interception request (LI request) to the LIG. The lawful interception request includes a public network IPv4 address and a port block. The LIG receives the LI request, and searches the RADIUS server for the name of the user, the account, and the session ID by using the public network IPv4 address.

S409: The LIG delivers an interception policy to the mini BNG device based on the account information of the user. The interception policy is, for example, intercepting a data packet in an ingress direction or a packet in an egress direction. The interception policy includes the account of the user and the session ID. The interception policy is, for example, a configure command for the mini BNG device. For example, the interception policy includes an account 1, a session ID1, and an ingress direction. The interception policy is used to indicate the mini BNG device to intercept a data packet in the ingress direction of the session ID1 of the account 1.

S410: The mini BNG device copies the data packet of the user according to the interception policy, and forwards the copied data packet to an interception platform.

With reference to FIG. 11A and FIG. 11B, the method 500 shown in FIG. 11A and FIG. 11B is an example of implementing the method 200 in a DS-Lite scenario. In other words, the method 500 shown in FIG. 11A and FIG. 11B describes how to perform tracing by using a RADIUS server in the DS-Lite scenario when a separate-style CGN device is used. In the method 500 shown in FIG. 11A and FIG. 11B, a first IP address is an IPV6 address, a second IP address is a public network IPv4 address, a communications system is a BNG system, and information about a user is stored in a user entry in a user table. A UP device in the BNG system is a mini BNG device (that is, an mBNG in FIG. 11A and FIG. 11B).

The method 500 shown in FIG. 11A and FIG. 11B includes the following steps S501 to S511.

S501: CPE, as a DHCP server, assigns a private network IPv4 address to a terminal.

S502: The CPE sends a dialing request. The dialing request is also referred to as a user online request. The dialing request is, for example, a PPPOE dialing request or a DHCP dialing request. A CP device broadcasts the dialing request to, for example, a layer-2 network. The mini BNG device (the UP device) receives the dialing request. The mini BNG device (the UP device) sends the dialing request to the CP device through a CPRi channel.

S503: The CP device sends an authentication request to a RADIUS server. After authentication of the RADIUS server succeeds, the RADIUS server assigns an IPV6 address to the user.

S504: The CP device delivers the IPV6 address of the user to a CGN device through an SCi.

S505: The CGN device assigns a public network IPv4 address and a port block based on the IPV6 address of the user. In addition, the CGN device adds a user entry to the user table. The newly added user entry stores a correspondence among the IPV6 address, the public network IPv4 address, and the port block.

S506: The CGN device reports the IPV6 address of the user, the public network IPV4 address, and the port block to the CP device through an SCi channel.

S507: The CP device sends an accounting start packet to the RADIUS server. The accounting start packet carries NAT tracing information of the user. The NAT tracing information includes the IPV6 address, the public network IPv4 address, and the port block.

S508: The CP device delivers the IPV6 address to the CPE. In addition, the CP device delivers the user entry to the mini BNG device through an SCi channel.

S509: The LIG requests account information of the user from the RADIUS server based on the public network IPv4 address and the port block. The account information of the user includes but is not limited to at least one of a name of the user, an account of the user, and a session ID.

S510: The LIG delivers an interception policy to the mini BNG device based on the account information of the user.

S511: The mini BNG device copies a data packet of the user according to the interception policy, and forwards the copied data packet to an interception platform.

In some embodiments, the NAT device implements a reliability solution, and the NAT device is a standby NAT device in an active NAT device and the standby NAT device in a dual-host standby relationship.

In some embodiments, an active-standby relationship between the NAT devices is configured by the CP device. For example, the NAT device has one or more CPUs. The NAT device sends CPU information to the CP device. The CPU information indicates a CPU resource of the NAT device. The CP device receives the CPU information, and selects a first CPU and a second CPU from the one or more CPUs of the NAT device. The CP device sends a configure command to the first CPU, and configures the first CPU as the active NAT device. The CP device sends a configure command to the second CPU, and configures the second CPU as the standby NAT device.

In some embodiments, the CP device can synchronize a user entry on the active NAT device to the standby NAT device, to ensure data consistency between the active NAT device and the standby NAT device. In this way, when the active NAT device is faulty, the standby NAT device can process a service based on the obtained user entry. The following uses steps S601 to S605 as an example for describing how the CP device synchronizes the user entry on the active NAT device to the standby NAT device.

S601: The active NAT device sends the information about the user to the CP device. The information about the user includes the correspondence among the first IP address, the second IP address, and the port block.

S602: The CP device receives the information about the user from the active NAT device.

S603: The CP device sends the information about the user to the standby NAT device.

S604: The standby NAT device receives the information about the user from the CP device.

S605: When the active NAT device is faulty, the standby NAT device assigns the second IP address to the user based on the information about the user.

The CP device delivers, to the standby NAT device, the information that is about the user and that is sent by the active NAT device, so that the standby NAT device obtains the information that is about the user and that is stored in the active NAT device. The information about the user is synchronized between the standby NAT device and the active NAT device, so that active-standby switching can be triggered when the active NAT device is faulty, to implement normal running of a service. In addition, an active-standby election mechanism similar to a VRRP does not need to be deployed for the standby NAT device and the active NAT device. In this way, CGNs do not need to be directly connected through a line, thereby simplifying a configuration and deployment of resources.

The foregoing reliability solution applicable to steps S601 to S605 includes a plurality of cases. For example, steps S601 to S605 are applied to an inter-chassis backup case between two NAT devices after the user is online. For example, steps S601 to S605 are applied to a 1:1 warm backup case between two NAT devices after the user is online. The following is described by using an example in combination with FIG. 12. In the method shown in FIG. 12, the two NAT devices are in a dual-host standby relationship. One of the two NAT devices is the active NAT device, that is, a master NAT device. The other one of the two NAT devices is the standby NAT device, that is, a slave NAT device. For example, the two NAT devices are two separate-style CGN devices. The active NAT device is an active CGN device. The active CGN device is also referred to as CGN (M). The standby NAT device is a standby CGN device. The standby CGN device is also referred to as CGN(S). The CP device communicates with the active CGN device, the standby CGN device, and the UP device by using interfaces such as a CPRi, an Mi, and an SCi. The CP device communicates with a RADIUS server based on the RADIUS protocol. The two NAT devices are referred to as, for example, two NAT instances. The two NAT instances have different instance IDs. One NAT instance is a NAT instance of the active CGN device, and the other NAT instance is a NAT instance of the standby CGN device.

A 1:1 warm backup method shown in FIG. 12 includes the following steps S701 to S708.

S701: After a user is online, a CP device determines an ID of a UP device when the user is online. Then, the CP device determines, based on configuration information, an active CGN device and a standby CGN device that are bound to the ID of the UP device.

S702: After the CP device interacts with a RADIUS server, the CP device generates a user entry, and delivers the user entry to the active CGN device.

S703: The active CGN device receives the user entry from the CP device to complete assignment of the user entry. The active CGN device returns the assigned user entry to the CP device.

S704: The CP device receives the user entry from the active CGN device, and delivers the user entry to the standby CGN device. In some other embodiments, the active CGN device delivers the user entry to the standby CGN device.

S705: The CP device completes RADIUS tracing.

S706: The CP device detects that the active CGN device is faulty.

In some embodiments, the active CGN device is an active CPU for implementing a CGN function. That the CP device detects that the active CGN device is faulty indicates detecting that the active CPU is faulty or detecting that a service board on which the primary CPU is located is faulty.

S707: The CP device determines a backup relationship between the active CGN device and the standby CGN device based on the ID that is of the UP device and that is bound to the CGN devices. The CP device determines the standby CGN device based on the active CGN device and the backup relationship between the active CGN device and the standby CGN device.

S708: The CP device directs traffic to the standby CGN device, so that the traffic is switched from the active CGN device to the standby CGN device.

In an active-standby switching process, how the CP device directs the traffic to a standby NAT device (the standby CGN device) includes a plurality of manners. The following is described by using examples with reference to two types of scenarios.

Scenario 1: Dual-Host Standby in a NAT44 Scenario

In some embodiments, the CP device refreshes a route priority corresponding to a public network address (a second IP address) on the standby NAT device, to implement traffic switching in the NAT44 scenario. Specifically, the active NAT device and the standby NAT device store the same public network IP address segment. A route priority of the public network IP address segment stored in the primary NAT device is high, and a route priority of the public network IP address segment stored in the standby NAT device is low. Therefore, when the active NAT device is normal, downlink traffic is routed and forwarded to the standby NAT device. When the active NAT device is faulty, the CP device interacts with the standby NAT device to perform the following steps S801 to S804. The downlink traffic indicates traffic sent from the UP device to user equipment. The downlink traffic is also referred to as network side traffic or public network side traffic. A source IP address in the downlink traffic is a public network IP address.

S801: If the active NAT device is in a faulty state, the CP device generates a first update message.

S802: The CP device sends the first update message to the standby NAT device.

The first update message is also referred to as a route priority update command. The first update message is used to indicate the standby NAT device to improve a route priority corresponding to a second IP address. The route priority corresponding to the second IP address is, for example, a route priority of a network segment to which the second IP address belongs. Each IP address in the network segment corresponds to the same route priority. The route priority corresponding to the second IP address is also referred to as the route priority of the public network IP network segment.

S803: The standby NAT device receives the first update message from the CP device.

S804: In response to the first update message, the standby NAT device improves the route priority corresponding to the second IP address.

When the active NAT device is faulty, the CP device delivers the first update message to the standby NAT device, to indicate the standby NAT device to adjust the route priority corresponding to the public network address. Because the route priority corresponding to the public network address of the standby NAT device is improved, traffic on a network side is switched from the active NAT device to the standby NAT device, so that the standby NAT device is upgraded to the active NAT device and replaces the previously faulty active NAT device to process the traffic on the network side, thereby avoiding transmission interruption of the traffic. In addition, because the switching of the traffic is directed by the CP device, it can be ensured that traffic bypass does not occur for the active NAT device and the standby NAT device. Particularly, the method can be applied to the NAT44 scenario. This helps implement dual-host standby in the NAT44 scenario.

For example, with reference to FIG. 12, CGN 1 and CGN 2 are active and standby to each other. Each CGN in the CGN 1 and the CGN 2 optionally includes a plurality of CPUs. The CGN 1 and the CGN 2 separately report CPU resources to the CP device. The CP device configures an active-standby relationship of the CGNs. A plurality of pairs of active and standby CPU instances are associated with the same loopback address. A route priority corresponding to the loopback address of the active CGN is high. In addition, a pair of active and standby CPUs serving as CGNs share a public network address segment. The public network address is, for example, 100.1.1.0/24. A route priority of an address segment to which a public network address of an active CPU belongs is higher than a route priority of an address segment to which a public network address of the standby CPU belongs. When the CPU of the CGN 1 (the active CGN) is faulty, the CGN 1 reports the fault event to the CP device. The CP device delivers a route priority adjust command to the CGN 2 (the standby CGN), to improve a priority of a public network address segment of the CPU of the standby CGN. After the CPU is faulty, a CR performs policy routing on UNI traffic according to a policy, and redirects the UNI traffic to the CGN 1 (the original active CGN). Then, the CR forwards the UNI traffic to the current master CGN 2 through a bypass tunnel or a directly connected link between the CGNs. The NNI traffic is directly sent to the CGN 2 because a public network address segment route is updated.

Scenario 2: Dual-Host Standby in a DS-Lite Scenario

In some embodiments, the active NAT device and the standby NAT device not only store the same public network IP address segment, but also configure the same IP address for a tunnel endpoint. When the active NAT device is faulty, the CP device refreshes a route priority corresponding to a public network address (the second IP address) on the standby NAT device and a priority corresponding to the IP address of the tunnel endpoint, to implement dual-host standby in the DS-Lite scenario. For example, when the active NAT device is faulty, the CP device interacts with the standby NAT device to perform the following steps S901 to S903, to implement traffic switching.

S901: If the active NAT device is in a faulty state, the CP device sends a first update message and a second update message to the standby NAT device.

The first update message is used to indicate the standby NAT device to improve a route priority corresponding to a second IP address. The second update message is used to indicate the standby NAT device to improve a route priority corresponding to a third IP address.

The third IP address is an IP address of a tunnel endpoint. A tunnel is, for example, a tunnel between a UP device and a NAT device. The tunnel is, for example, a DS-Lite tunnel. The tunnel endpoint is, for example, a NAT device. The tunnel endpoint includes an active NAT device or a standby NAT device. Specifically, when the active NAT device is normal, the tunnel endpoint is the active NAT device. When the active NAT device is faulty, the tunnel endpoint is switched from the original active NAT device to the standby NAT device. In some embodiments, the tunnel endpoint corresponds to a loopback port on the NAT device, and the third IP address is a loopback address. In addition, a route priority corresponding to the third IP address in the active NAT device is high, and a route priority corresponding to the third IP address in the standby NAT device is low. For example, with reference to FIG. 13, CGN 1 and CGN 2 are associated with the same loopback address. A loopback address of a tunnel endpoint on the CGN 1 is 1.1.1.1/32, and a loopback address of a tunnel endpoint on the CGN 2 is also 1.1.1.1/32. In addition, a route priority of the IP address 1.1.1.1/32 of the tunnel endpoint in the CGN 1 is high, and a route priority of the IP address 1.1.1.1/32 of the tunnel endpoint in the CGN 2 is low. In this example, the loopback address 1.1.1.1/32 is an example for describing the third IP address.

Figure 13:
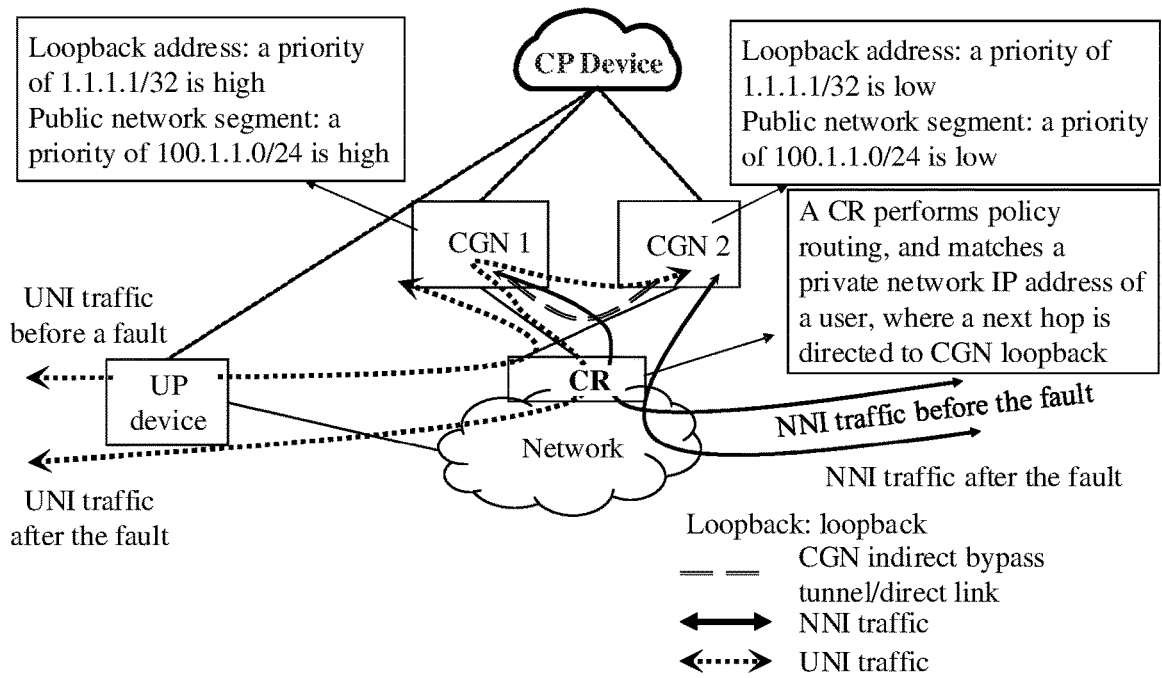
FIG. 13 is a schematic diagram of dual-host standby between CGN devices in a DS-Lite scenario according to an embodiment of this application.

In addition, a route priority of the public network IP address segment stored in the primary NAT device is high, and a route priority of the public network IP address segment stored in the standby NAT device is low. For example, with reference to FIG. 13, the CGN 1 and the CGN 2 in FIG. 13 are examples for describing the active NAT device and the standby NAT device in a dual-host standby relationship. When a CPU is used to implement a CGN device, the CGN 1 and the CGN 2 are referred to as, for example, a pair of active and standby CPUs. The CGN 1 and the CGN 2 share the same public network IP address segment. For example, the public network IP address segment in the CGN 1 is 100.1.1.0/24, and the public network IP address segment in the CGN 2 is also 100.1.1.0/24. A route priority of the public network IP address segment 100.1.1.0/24 in the CGN 1 is high, and a route priority of the public network IP address segment 100.1.1.0/24 in the CGN 2 is low. In this example, the public network IP address segment 100.1.1.0/24 is an example for describing the network segment to which the second IP address belongs.

S902: The standby NAT device receives a first update message and a second update message from the CP device.

S903: In response to the first update message, the standby NAT device improves the route priority corresponding to the second IP address. In addition, in response to the second update message, the standby NAT device improves the route priority corresponding to the third IP address.

For example, with reference to FIG. 13, when the CPU of the CGN 1 (the active CGN device) is faulty, the CGN 1 reports the CPU fault event to the CP device. The CP device delivers the first update message and the second update message to the CGN 2 (the standby CGN device), to improve the route priority of the IP address of the tunnel endpoint of the CGN 2 (the standby CGN device). In addition, the priority of the public network address segment of the CGN 2 (the standby CGN device) is improved. Before the fault, NNI traffic is transmitted between the CGN 1 and a transmission network. After the fault, the NNI traffic is transmitted between the CGN 2 and the transmission network. Herein, an NNI is an interface between a CGN device and a PSN (packet switched network). The NNI traffic is also referred to as public network side traffic, for example, traffic transmitted between the CGN and the PSN. Before the fault, UNI traffic is transmitted between the CGN 1 and the UP device. After the fault, the UNI traffic is transmitted between the CGN 2 and the UP device. Herein, a UNI indicates a communications interface between a network side and a user side, that is, a communications interface between a CGN device and user equipment. The UNI traffic is also referred to as user side traffic, for example, traffic transmitted between the user equipment and the CGN.

When the active NAT device is faulty, the CP device delivers the first update message and the second update message to the standby NAT device, to indicate the standby NAT device to adjust the route priority corresponding to the public network address and the route priority corresponding to the address of the tunnel endpoint. Because the route priority corresponding to the public network address of the standby NAT device is improved, traffic on a network side is switched from the active NAT device to the standby NAT device. Because the route priority corresponding to the address of the tunnel endpoint of the standby NAT device is improved, traffic on a user side is switched from the active NAT device to the standby NAT device. Therefore, the standby NAT device is upgraded to the active NAT device and replaces the previous faulty active NAT device to process the traffic on the network side and the traffic on the user side, thereby avoiding transmission interruption of the traffic. In addition, because the switching of the traffic is directed by the CP device, it can be ensured that traffic bypass does not occur for the active NAT device and the standby NAT device. Particularly, the method can be applied to the DS-Lite scenario. This helps implement dual-host standby in the DS-Lite scenario.

Some embodiments of this application provide a method for implementing 1:1 warm backup between two UP devices after the user is online. The following is described by using an example in combination with FIG. 14. In the method shown in FIG. 14, the two UP devices are in a dual-host standby relationship. One of the two UP devices is an active UP device, that is, a master UP device. The active UP device is also referred to as a UP device (M). The other one of the two UP devices is a standby UP device, that is, a slave UP device. The standby UP device is also referred to as a UP device(S). For example, the two UP devices are two separate-style CGN devices. A CP device communicates with the active UP device and the standby UP device by using interfaces such as a CPRi, an Mi, and an SCi. In the method shown in FIG. 14, a NAT device is a separate-style CGN device.

Figure 14:
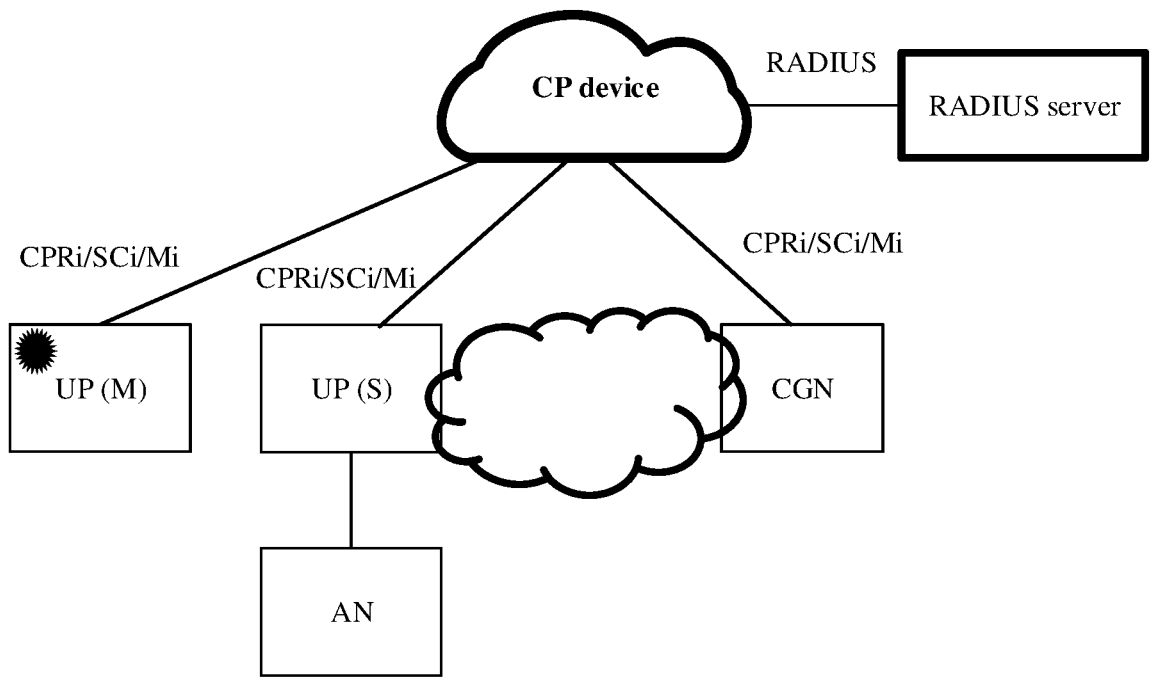
FIG. 14 is a schematic diagram of dual-host standby between UP devices according to an embodiment of this application.

The 1:1 warm backup method shown in FIG. 14 includes the following steps S1001 to S1004.

S1001: When a user is online, the CP device delivers a user entry to both the active UP device and the standby UP device.

S1002: A terminal sends traffic. The active UP device receives the traffic from the terminal. The active UP device forwards the traffic to a CGN device. The traffic sent by the terminal is also referred to as uplink traffic.

S1003: The CGN device receives the traffic from the active UP device, and generates a NAT translation entry based on the traffic. It can be learned from this step that the uplink traffic in this embodiment still passes through the CGN device.

S1004: When the active UP device is faulty, the UP device accessed by the user is switched from the active UP device to the standby UP device. After the terminal sends the traffic, the standby UP device receives the traffic, and forwards the traffic to the CGN device. Because a private network IPv4 address of the user does not change, the CGN device does not perceive a fault status of the UP device.

Figure 15:
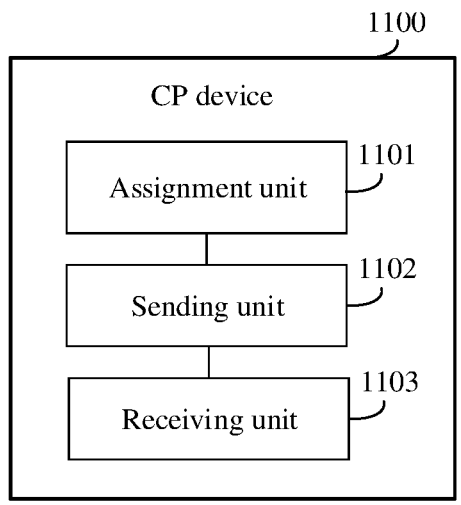
FIG. 15 is a schematic diagram of a structure of a CP device according to an embodiment of this application.

FIG. 15 is a schematic diagram of a possible structure of a CP device. The CP device 110 shown in FIG. 15 implements, for example, the functions of the CP device in the foregoing method embodiments.

With reference to FIG. 15, the CP device 110 includes an assignment unit 1101, a sending unit 1102, and a receiving unit 1103. All or some of the units in the CP device 110 are implemented by using software, hardware, firmware, or any combination thereof. The units in the CP device 110 are configured to perform the corresponding functions of the CP device in the foregoing method 200. Specifically, the assignment unit 1101 is configured to support the CP device 110 in performing step S210. The sending unit 1102 is configured to support the CP device 110 in performing step S220 and step S270. The receiving unit 1103 is configured to support the CP device 110 in performing step S260.

In some embodiments, the receiving unit 1103, the assignment unit 1101, or the sending unit 1102 is further configured to support the CP device 110 in executing another process executed by the CP device in the technology described in this specification. For example, the receiving unit 1103 is configured to support the CP device 110 in performing various receiving operations such as step S602 and step S704 performed by the CP device in the embodiments of the method 300, the method 400, the method 500, and the like. The assignment unit 1101 is configured to support the CP device 110 in performing various assignment operations such as step S302 and step S403 performed by the CP device in the embodiments of the method 200, the method 300, the method 400, the method 500, and the like. The sending unit 1102 is configured to support the CP device 110 in performing various sending operations such as step S303, step S309, step S402, step S406, step S503, step S504, step S507, step S603, step S702, step S802, step S901, or step S1001 performed by the CP device in the embodiments of the method 200, the method 300, the method 400, the method 500, and the like. For a specific execution process, refer to detailed descriptions of corresponding steps in the foregoing method embodiments. Details are not described one by one herein again.

In this embodiment of this application, division into the units is an example, and is merely logical function division. During actual implementation, another optional division manner may be used.

In some embodiments, the units in the CP device 110 are integrated into one processing unit. For example, the units in the CP device 110 are integrated into the same chip. The chip includes a processing circuit, and an input interface and an output interface that are internally connected to the processing circuit for communication. The assignment unit 1101 is implemented by using the processing circuit in the chip. The receiving unit 1103 is implemented by using the input interface in the chip. The sending unit 1102 is implemented by using the output interface in the chip. For example, the chip is implemented by using one or more field-programmable gate arrays (FPGA), a programmable logic device (PLD), a controller, a state machine, gate logic, a discrete hardware component, any other proper circuit, a circuit capable of executing various functions described in this application, or any combination thereof.

In some other embodiments, the units in the CP device 110 exist physically alone. In some other embodiments, some units in the CP device 110 exist physically alone, and some other units are integrated into one unit. For example, in some embodiments, the assignment unit 1101 and the sending unit 1102 are the same unit. In some other embodiments, the assignment unit 1101 and the sending unit 1102 are different units. In some embodiments, integration of different units is implemented in a form of hardware, that is, different units correspond to the same hardware. For another example, integration of different units is implemented in a form of a software unit.

When the CP device 110 is implemented by using hardware, for example, the assignment unit 1101 in the CP device 110 is implemented by using, for example, a processor 1401 in a device 1400. The receiving unit 1103 and the sending unit 1102 in the CP device 110 are implemented by using, for example, a communications interface 1404 in the device 1400. For another example, the assignment unit 1101 in the CP device 110 is implemented by using, for example, at least one of a central processing unit 1311, a central processing unit 1331, or a network processor 1332 in a device 1300. The receiving unit 1103 and the sending unit 1102 in the CP device 110 are implemented by using, for example, at least one of a physical interface card 1333 or a physical interface card 1343 in the device 1300.

When the CP device 110 is implemented by using software, the units in the CP device 110 are, for example, software generated after a processor in the device 1400 or the device 1300 reads program code stored in a memory. For example, the CP device 110 is a virtual device. The virtual device includes but is not limited to at least one of a virtual machine, a container, and a Pod. In some embodiments, the CP device 110 in a form of a virtual machine is deployed on a hardware device (for example, a physical server). For example, the CP device 110 is implemented based on a general-purpose physical server in combination with a network functions virtualization (NFV) technology. When the virtual machine is used for implementation, the CP device 110 is, for example, a virtual host, a virtual router, or a virtual switch. After reading this application, a person skilled in the art may virtualize the CP device 110 on a general-purpose physical server by using the NFV technology. In some other embodiments, the CP device 110 in a form of a container (for example, a docker container) is deployed on a hardware device. For example, a process in which the CP device 110 executes the foregoing method embodiments is encapsulated in an image file. The hardware device creates the CP device 110 through running the image file. In some other embodiments, the CP device 110 in a form of a Pod is deployed on a hardware device. The Pod includes a plurality of containers. Each container is configured to implement one or more units in the CP device 110.

Figure 16:
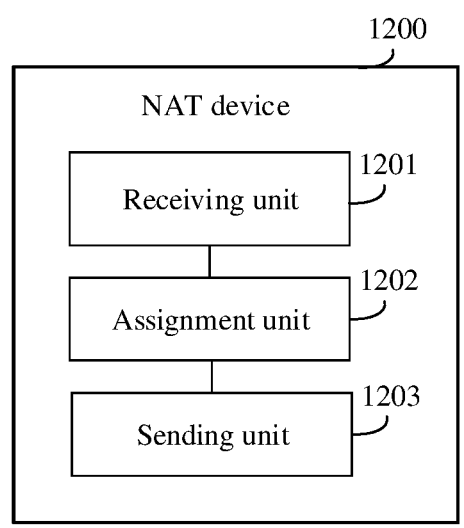
FIG. 16 is a schematic diagram of a structure of a NAT device according to an embodiment of this application.

FIG. 16 is a schematic diagram of a possible structure of a NAT device. The NAT device 120 shown in FIG. 16 implements, for example, the functions of the NAT device (for example, a CGN device) in the foregoing method embodiments.

With reference to FIG. 16, the NAT device 120 includes a receiving unit 1201, an assignment unit 1202, and a sending unit 1203. All or some of the units in the NAT device 120 are implemented by using software, hardware, firmware, or any combination thereof. The units in the NAT device 120 are configured to perform the corresponding functions of the NAT device in the foregoing method 200. Specifically, the receiving unit 1201 is configured to support the NAT device 120 in performing step S230. The assignment unit 1202 is configured to support the NAT device 120 in performing step S24. The sending unit 1203 is configured to support the NAT device 120 in performing step S250.

In some embodiments, the receiving unit 1201, the assignment unit 1202, or the sending unit 1203 is further configured to support the NAT device 120 in executing another process executed by the NAT device in the technology described in this specification or another process executed by the CGN device. For example, the receiving unit 1201 is configured to support the NAT device 120 in performing various receiving operations such as at least one of step S604, step S703, step S803, step S902, and step S1003 performed by the NAT device in the embodiments of the method 300, the method 400, the method 500, and the like. The assignment unit 1202 is configured to support the NAT device 120 in performing various processing operations such as at least one of step S304, step S404, step S505, and step S605 performed by the NAT device in the embodiments of the method 300, the method 400, the method 500, and the like. The sending unit 1203 is configured to support the NAT device 120 in performing various sending operations such as at least one of step S305 and step S601 performed by the NAT device in the embodiments of the method 300, the method 400, the method 500, and the like. For a specific execution process, refer to detailed descriptions of corresponding steps in the embodiments of the method 300, the method 400, the method 500, and the like. Details are not described one by one herein again.

In this embodiment of this application, division into the units is an example, and is merely logical function division. During actual implementation, another optional division manner may be used.

In some embodiments, the units in the NAT device 120 are integrated into one processing unit. For example, the units in the NAT device 120 are integrated into the same chip. The chip includes a processing circuit, and an input interface and an output interface that are internally connected to the processing circuit for communication. The assignment unit 1202 is implemented by using the processing circuit in the chip. The receiving unit 1201 is implemented by using the input interface in the chip. The sending unit 1203 is implemented by using the output interface in the chip. For example, the chip is implemented by using one or more field-programmable gate arrays (FPGAs), a programmable logic device (PLD), a controller, a state machine, gate logic, a discrete hardware component, any other proper circuit, a circuit capable of executing various functions described in this application, or any combination thereof.

In some other embodiments, the units in the NAT device 120 exist physically alone. In some other embodiments, some units in the NAT device 120 exist physically alone, and some other units are integrated into one unit. For example, in some embodiments, the assignment unit 1202 and the sending unit 1203 are the same unit. In some other embodiments, the assignment unit 1202 and the sending unit 1203 are different units. In some embodiments, integration of different units is implemented in a form of hardware, that is, different units correspond to the same hardware. For another example, integration of different units is implemented in a form of a software unit.

When the NAT device 120 is implemented by using hardware, the assignment unit 1202 in the NAT device 120 is implemented by using, for example, a processor 1401 in a device 1400. The receiving unit 1201 and the sending unit 1203 in the NAT device 120 are implemented by using, for example, a communications interface 1404 in the device 1400. For another example, the assignment unit 1202 in the NAT device 120 is implemented by using, for example, at least one of a central processing unit 1311, a central processing unit 1331, or a network processor 1332 in a device 1300. The receiving unit 1201 and the sending unit 1203 in the NAT device 120 are implemented by using, for example, at least one of a physical interface card 1333 or a physical interface card 1343 in the device 1300.

When the NAT device 120 is implemented by using software, the units in the NAT device 120 are, for example, software generated after a processor in the device 1400 or the device 1300 reads program code stored in a memory. For example, the NAT device 120 is a virtual device. The virtual device includes but is not limited to at least one of a virtual machine, a container, and a Pod. In some embodiments, the NAT device 120 in a form of a virtual machine is deployed on a hardware device (for example, a physical server). For example, the NAT device 120 is implemented based on a general-purpose physical server in combination with a network functions virtualization (NFV) technology. When the virtual machine is used for implementation, the NAT device 120 is, for example, a virtual host, a virtual router, or a virtual switch. After reading this application, a person skilled in the art may virtualize the NAT device 120 on a general-purpose physical server by using the NFV technology. In some other embodiments, the NAT device 120 in a form of a container (for example, a docker container) is deployed on a hardware device. For example, a process in which the NAT device 120 executes the foregoing method embodiments is encapsulated in an image file. The hardware device creates the NAT device 120 through running the image file. In some other embodiments, the NAT device 120 in a form of a Pod is deployed on a hardware device. The Pod includes a plurality of containers. Each container is configured to implement one or more units in the NAT device 120.

By using the CP device 110 and the NAT device 120, the foregoing separately describes, from a perspective of a logical function, how to implement the CP device and the NAT device. By using the device 1300 or the device 1400, the following describes, from a perspective of hardware, how to implement the CP device and the NAT device. The device 1300 shown in FIG. 17 or the device 1400 shown in FIG. 18 is an example for describing hardware structures of the CP device and the NAT device.

The device 1300 or the device 1400 corresponds to the CP device or the NAT device in the foregoing method embodiments. Hardware, modules, and operations and/or functions of the device 1300 or the device 1400 are separately used to implement steps and methods implemented by the CP device or the NAT device in the method embodiments. For a specific procedure of how the device 1300 or the device 1400 implements NAT tracing based on a RADIUS, refer to the foregoing method embodiments for details. For brevity, details are not described herein again. Steps in the method embodiments are completed by using a hardware integrated logic circuit in the processor of the device 1300 or the device 1400, or by using instructions in a form of software. The steps of the method disclosed with reference to embodiments of this application may be directly performed by a hardware processor, or may be performed by a combination of hardware and software modules in the processor. For example, the software module is located in a mature storage medium in the art, such as a random access memory, a flash memory, a read-only memory, a programmable read-only memory, an electrically erasable programmable memory, or a register. The storage medium is located in the memory. The processor reads information from the memory, and completes the steps of the foregoing methods in combination with the hardware. Details are not described herein again to avoid repetition.

Figure 17:
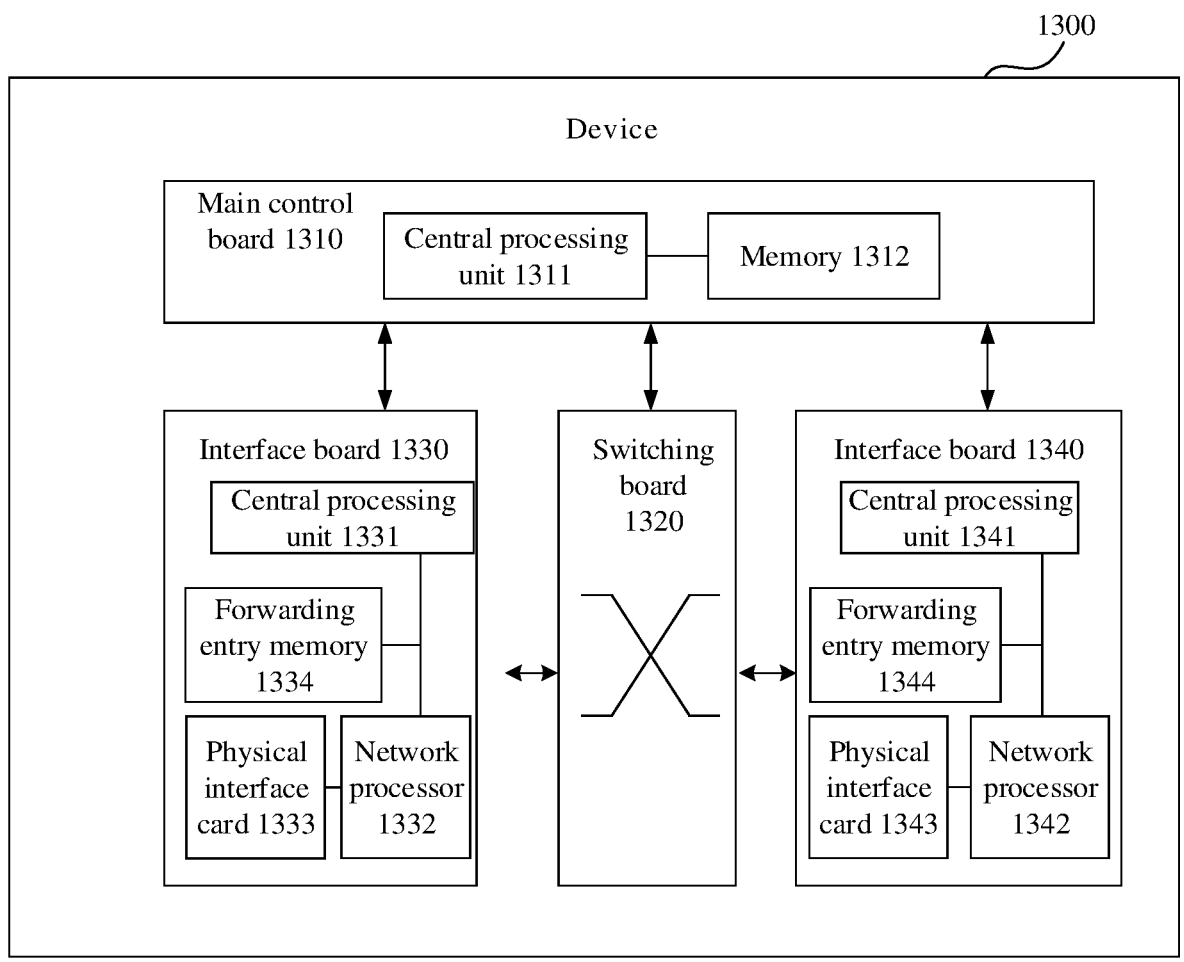
FIG. 17 is a schematic diagram of a structure of a CP device according to an embodiment of this application.
Figure 18:
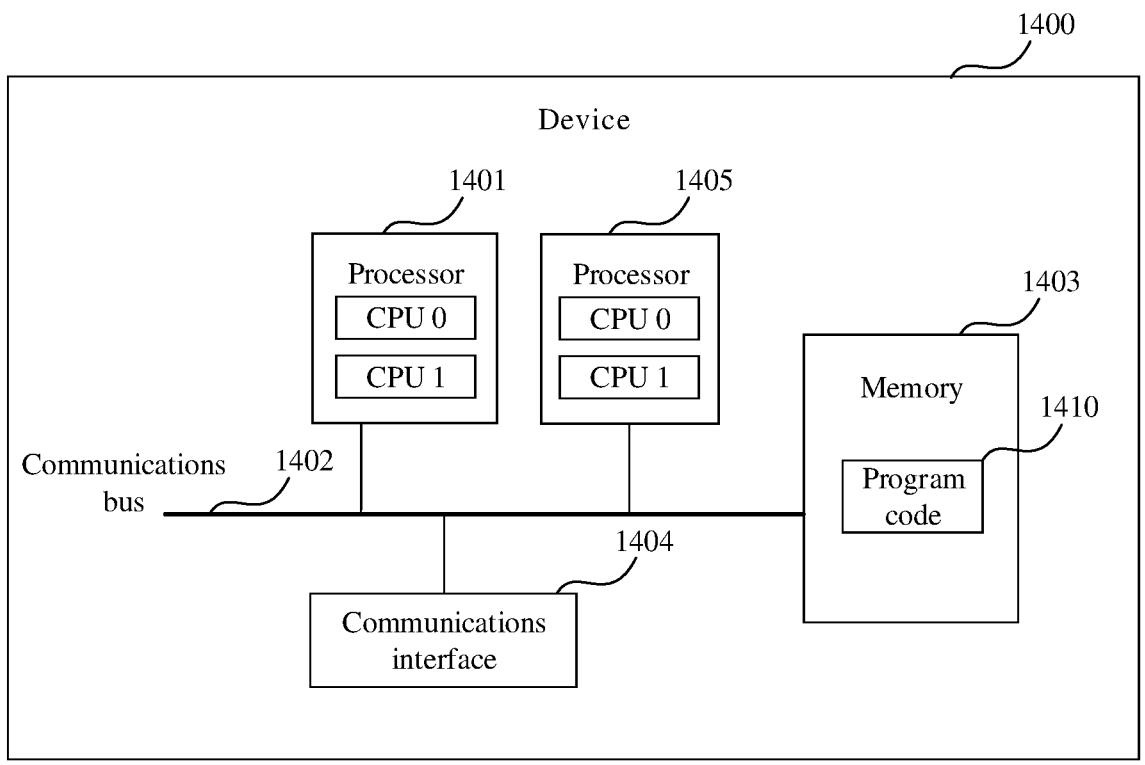
FIG. 18 is a schematic diagram of a structure of a NAT device according to an embodiment of this application.

FIG. 17 is a schematic diagram of a structure of a device 1300 according to an example embodiment of this application. The device 1300 may be, for example, configured as a CP device or a NAT device. The device 1300 includes a main control board 1310 and an interface board 1330.

The main control board is also referred to as a main processing unit (MPU) or a route processor card. The main control board 1310 is configured to control and manage components in the device 1300, which includes route calculation, device management, device maintenance, and a protocol processing function. The main control board 1310 includes a central processing unit 1311 and a memory 1312.

The interface board 1330 is also referred to as a line processing unit (LPU) card, a line card, or a service board. The interface board 1330 is configured to: provide various service interfaces, and implement data packet forwarding. The service interface includes but is not limited to an Ethernet interface, a POS (Packet over SONET/SDH) interface, or the like. The Ethernet interface is, for example, a flexible Ethernet service interface (Flexible Ethernet Clients, FlexE Clients). The interface board 1330 includes a central processing unit 1331, a network processor 1332, a forwarding entry memory 1334, and a physical interface card (PIC) 1333.

The central processing unit 1331 on the interface board 1330 is configured to: control and manage the interface board 1330, and communicate with the central processing unit 1311 on the main control board 1310.

The network processor 1332 is configured to implement forwarding processing of a packet. A form of the network processor 1332 is, for example, a forwarding chip. Specifically, the network processor 1332 is configured to forward a received packet based on a forwarding table stored in the forwarding entry memory 1334; and if a destination address of the packet is an address of the device 1300, send the packet to a CPU (for example, the central processing unit 1311) for processing; or if a destination address of the packet is not an address of the device 1300, find, in the forwarding table based on the destination address, a next hop and an egress interface corresponding to the destination address, and forward the packet to the egress interface corresponding to the destination address. Processing of an uplink packet includes: packet processing of an ingress interface and searching the forwarding table; and processing of a downlink packet includes searching the forwarding table and the like.

The physical interface card 1333 is configured to implement an interconnection function of a physical layer. Original traffic enters the interface board 1330 from the physical interface card 1333, and a processed packet is sent out from the physical interface card 1333. The physical interface card 1333, also referred to as a subboard, may be installed on the interface board 1330, and is responsible for converting a photoelectric signal into a packet, performing a validity check on the packet, and then forwarding the packet to the network processor 1332 for processing. In some embodiments, the central processing unit may also execute functions of the network processor 1332, for example, implement software forwarding based on a general-purpose CPU, so that the physical interface card 1333 does not need the network processor 1332.

Optionally, the device 1300 includes a plurality of interface boards. For example, the device 1300 further includes an interface board 1340. The interface board 1340 includes a central processing unit 1341, a network processor 1342, a forwarding entry memory 1344, and a physical interface card 1343.

Optionally, the device 1300 further includes a switching board 1320. The switching board 1320 is also referred to as, for example, a switch fabric unit (SFU). When the network device has a plurality of interface boards 1330, the switching board 1320 is configured to complete data exchange between the interface boards. For example, the interface board 1330 and the interface board 1340 communicate with each other by using, for example, the switching board 1320.

The main control board 1310 and the interface board 1330 are coupled. For example, the main control board 1310, the interface board 1330, the interface board 1340, and the switching board 1320 are connected to a platform backplane by using a system bus for interconnection. In a possible implementation, an inter-process communication (IPC) channel is established between the main control board 1310 and the interface board 1330. Communication is performed between the main control board 1310 and the interface board 1330 by using the IPC channel.

Logically, the device 1300 includes a control plane and a forwarding plane. The control plane includes a main control board 1310 and a central processing unit 1331. The forwarding plane includes components performing forwarding, for example, the forwarding entry memory 1334, the physical interface card 1333, and the network processor 1332. The control plane executes functions such as functions of a router, generating a forwarding table, processing signaling and protocol packets, and configuring and maintaining a status of a device. The control plane delivers the generated forwarding table to the forwarding plane. At the forwarding plane, after table querying based on the forwarding table delivered by the control plane, the network processor 1332 forwards the packet received by the physical interface card 1333. The forwarding table delivered by the control plane is, for example, stored in the forwarding entry memory 1334. In some embodiments, the control plane and the forwarding plane are, for example, fully separated from each other, and are not on the same device.

It should be understood that an operation on the interface board 1340 is consistent with an operation on the interface board 1330 in this embodiment of this application. For brevity, details are not described again. It should be understood that the device 1300 in this embodiment may correspond to the CP device or the NAT device in the foregoing method embodiments. The main control board 1310, and the interface board 1330 and/or the interface board 1340 in the device 1300 may implement, for example, functions of the CP device or the NAT device and/or steps implemented by the CP device or the NAT device in the method embodiments. For brevity, details are not described herein again.

It should be noted that, there may be one or more main control boards. When there are a plurality of main control boards, the plurality of main control boards may include, for example, an active main control board and a standby main control board. There may be one or more interface boards. The network device with a stronger data processing capability provides more interface boards. There may also be one or more physical interface cards on the interface board. There may be no switching board or one or more switching boards. When there are a plurality of switching boards, load balancing and redundancy backup may be implemented together. In centralized forwarding architecture, the network device may not need a switching board, and the interface board is responsible for a service data processing function of an entire system. In distributed forwarding architecture, the network device may include at least one switching board, and data is exchanged between a plurality of interface boards by using the switching board, to provide large-capacity data exchange and processing capabilities. Therefore, data accessing and processing capabilities of a network device with the distributed architecture are better than those of a device with the centralized architecture. Optionally, a form of the network device may be that there is only one card, that is, there is no switching board, and functions of the interface board and the main control board are integrated on the card. In this case, a central processing unit on the interface board and a central processing unit on the main control board may be combined into one central processing unit on the card, to perform functions after the central processing unit on the interface board and the central processing unit on the main control board are superposed. The device in this form has relatively low data exchange and processing capabilities (for example, a network device such as a low-tier switch or a router). Specific architecture that is to be used depends on a specific networking deployment scenario. This is not limited herein.

FIG. 18 is a schematic diagram of a structure of a device 1400 according to an example embodiment of this application. The device 1400 may be configured as a CP device or a NAT device. The device 1400 may be a host, a server, a personal computer, or the like. The device 1400 may be implemented by using a general bus system structure.

The device 1400 includes at least one processor 1401, a communications bus 1402, a memory 1403, and at least one communications interface 1404.

The processor 1401 is, for example, a general-purpose central processing unit (CPU), a network processor (NP), a graphics processing unit (GPU), a neural network processor (neural-network processing units, NPU), a data processing unit (DPU), a microprocessor, or one or more integrated circuits configured to implement the solutions of this application. For example, the processor 1401 includes an application-specific integrated circuit (ASIC), a programmable logic device (PLD), or a combination thereof. For example, the PLD may be a complex programmable logic device (CPLD), a field-programmable logic gate array (field-programmable gate array, FPGA), a generic array logic (GAL), or any combination thereof.

The communications bus 1402 is configured to transmit information between the foregoing components. The communications bus 1402 may be classified into an address bus, a data bus, a control bus, and the like. For ease of representation, only one bold line is used for representation in FIG. 18, but this does not mean that there is only one bus or only one type of bus.

For example, the memory 1403 is a read-only memory (ROM) or another type of static storage device that can store static information and instructions, or a random access memory (RAM) or another type of dynamic storage device that can store information and instructions, or is an electrically erasable programmable read-only memory (EEPROM), a compact disc read-only memory (CD-ROM) or another optical disk storage, an optical disc storage (including a compact disc, a laser disc, an optical disc, a digital versatile disc, a Blu-ray disc, or the like), a disk storage medium or another magnetic storage device, or any other medium that can be used to carry or store expected program code in a form of instructions or a data structure and that can be accessed by a computer. However, the memory 1403 is not limited thereto. The memory 1403 may be, for example, exist independently, and be connected to the processor 1401 by using the communications bus 1402. Alternatively, the memory 1403 may be integrated with the processor 1401.

The communications interface 1404 is any type of apparatus using a transceiver, and is configured to communicate with another device or a communication network. The communications interface 1404 includes a wired communications interface, and may also include a wireless communications interface. The wired communications interface may be, for example, an Ethernet interface. The Ethernet interface may be an optical interface, an electrical interface, or a combination thereof. The wireless communications interface may be, for example, a wireless local area network (WLAN) interface, a cellular network communications interface, or a combination thereof.

During specific implementation, in an embodiment, the processor 1401 may include one or more CPUs such as a CPU 0 and a CPU 1 in FIG. 18.

During specific implementation, in an embodiment, the device 1400 may include a plurality of processors, for example, the processor 1401 and a processor 1405 shown in FIG. 18. Each of these processors may be a single processor (single-CPU), or may be a multi processor (multi-CPU). The processor herein may indicate one or more devices, circuits, and/or processing cores configured to process data (for example, computer program instructions).

During specific implementation, in an embodiment, the device 1400 may further include an output device and an input device. The output device communicates with the processor 1401, and may display information in a plurality of manners. For example, the output device may be a liquid crystal display (LCD), a light emitting diode (LED) display device, a cathode ray tube (CRT) display device, or a projector. The input device communicates with the processor 1401, and may receive a user input in a plurality of manners. For example, the input device may be a mouse, a keyboard, a touchscreen device, or a sensor device.

In some embodiments, the memory 1403 is configured to store program code 1410 for executing the solutions of this application, and the processor 1401 may execute the program code 1410 stored in the memory 1403. In other words, the device 1400 can implement the method provided in the method embodiments by using the processor 1401 and the program code 1410 in the memory 1403.

The device 1400 in this embodiment of this application may correspond to the CP device or the NAT device in the foregoing method embodiments. In addition, the processor 1401, the communications interface 1404, and the like in the device 1400 may implement the functions of the CP device or the NAT device in the foregoing method embodiments and/or steps and methods implemented by the CP device or the NAT device in the foregoing method embodiments. For brevity, details are not described herein again.

Figure 19:
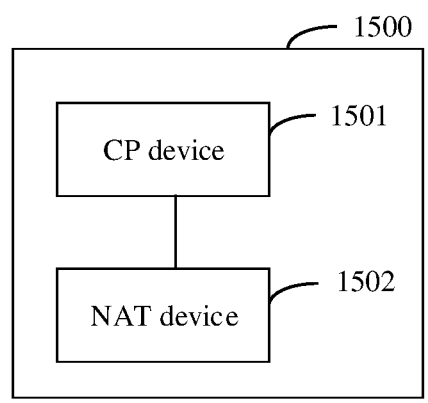
FIG. 19 is a schematic diagram of a structure of a network system 1500 according to an embodiment of this application.

With reference to FIG. 19, an embodiment of this application provides a communications system 1500. The system 1500 includes a CP device 1501 and a NAT device 1502. Optionally, the CP device 1501 is the CP device 1100 shown in FIG. 15, or the device 1300 shown in FIG. 17, or the device 1400 shown in FIG. 18; and the NAT device 1502 is the NAT device 1200 shown in FIG. 16, or the device 1300 shown in FIG. 17, or the device 1400 shown in FIG. 18.

A person of ordinary skill in the art may be aware that, the method steps and units described with reference to embodiments disclosed in this specification can be implemented by electronic hardware, computer software, or a combination thereof. To clearly describe the interchangeability between the hardware and the software, the foregoing has generally described steps and compositions of each embodiment based on functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in another manner. For example, the described apparatus embodiments are merely examples. For example, division into the units is merely logical function division. During actual implementation, another division manner may be used. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of embodiments of this application.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technologies, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

Terms such as "first" and "second" in this application are used to distinguish between same items or similar items with basically same functions. It should be understood that "first" and "second" do not have logic or time sequence dependency, and do not limit a quantity and an implementation sequence. It should be further understood that although terms such as "first" and "second" are used to describe various elements in the following, these elements are not limited by these terms. The terms are merely used to distinguish one element from another element. For example, without departing from the scope of the examples, a first IP address may also be referred to as a second IP address, and similarly the second IP address may also be referred to as the first IP address. The first IP address and the second IP address may both be IP addresses. In some cases, the first IP address and the second IP address may be different separate IP addresses.

In this application, the term "at least one" means one or more. The terms "system" and "network" may be usually used interchangeably in this specification.

It should also be understood that the term "if" may be interpreted as "when" (or "upon"), "in response to determining", or "in response to detection". Similarly, according to the context, the phrase "if it is determined that" or "if (a stated condition or event) is detected" may be interpreted as a meaning of "when it is determined that" or "in response to determining" or "when (a stated condition or event) is detected" or "in response to detecting (a stated condition or event)".

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus.

The computer instructions may be stored in a computer-readable storage medium or may be transmitted from a computer-readable storage medium to another computer-readable storage medium. For example, the computer program instructions may be transmitted from a website, computer, server, or data center to another website, computer, server, or data center in a wired or wireless manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive), or the like.

A person of ordinary skill in the art may understand that all or some of the steps of embodiments may be implemented by hardware or a program instructing related hardware. The program may be stored in a computer-readable storage medium. The storage medium may be a read-only memory, a magnetic disk, an optical disc, or the like.

In conclusion, the foregoing embodiments are merely intended for describing the technical solutions of this application, but not for limiting this application. Although this application is described in detail with reference to the foregoing embodiments, a person of ordinary skill in the art should understand that modifications to the technical solutions described in the foregoing embodiments or equivalent replacements to some technical features thereof may still be made, without departing from the scope of the technical solutions of embodiments of this application.

What is claimed is:

1. A network device, applied to a control plane (CP) device in a communications system in which a CP and a user plane (UP) are separated, the network device comprising:
    at least one processor; and
    one or more non-transitory memories coupled to the at least one processor and storing programming instructions, wherein the at least one processor is configured to execute the programming instructions to cause the network device to:
    assign a first Internet protocol (IP) address to a user;
    send the first IP address to a network address translation (NAT) device;
    receive information about the user from the NAT device, wherein the information about the user comprises a correspondence among the first IP address, a second IP address, and a port block, wherein the second IP address is a public network IP address that is assigned by the NAT device to the user based on the first IP address, and the port block comprises at least one port number that is assigned by the NAT device to the user; and
    send an accounting packet to a remote authentication dial in user service (RADIUS) server, wherein the accounting packet comprises the first IP address and the second IP address and the port block.

2. The network device according to claim 1, wherein the first IP address comprises at least one of a private network Internet protocol version 4 (IPv4) address or an Internet protocol version 6 (IPv6) address.

3. The network device according to claim 1, wherein the communications system comprises a gateway system, and the gateway system is a broadband network gateway (BNG) system or a broadband remote access server (BRAS) system.

4. The network device according to claim 1, wherein the at least one processor is further configured to execute the programming instructions to cause the network device to:
    receive a port block set from the RADIUS server, wherein the port block set comprises the port block; and
    send the port block set to the NAT device.

5. The network device according to claim 1, wherein the at least one processor is further configured to execute the programming instructions to cause the network device to:
when the user is offline,
send a delete message to the NAT device, wherein the delete message indicates the NAT device to delete the information that is about the user and that is stored in the NAT device; and
delete the information that is about the user and that is stored in the CP device.

6. The network device according to claim 1, wherein the NAT device comprises an active NAT device and a standby NAT device, each of which is a reserve one to the other, and the at least one processor is further configured to execute the programming instructions to cause the network device to:
receive the information about the user from the active NAT device.

7. The network device according to claim 6, wherein the at least one processor is further configured to execute the programming instructions to cause the network device to:
send the information about the user to the standby NAT device.

8. The network device according to claim 6, wherein the at least one processor is further configured to execute the programming instructions to cause the network device to:
when the active NAT device is in a faulty state, send a first update message to the standby NAT device, wherein the first update message indicates the standby NAT device to increase a route priority corresponding to the second IP address.

9. A network device, applied to a network address translation (NAT) device, the network device comprising:
at least one processor; and
one or more non-transitory memories coupled to the at least one processor and storing programming instructions, wherein the at least one processor is configured to execute the programming instructions to cause the network device to:
receive, from a control plane (CP) device in a communications system in which a CP and a user plane (UP) are separated, a first Internet protocol (IP) address that is assigned by the CP device to a user;
assign a second IP address and at least one port number to the user based on the first IP address, wherein the second IP address is a public network IP address; and
send information about the user to the CP device, wherein the information about the user comprises a correspondence among the first IP address, the second IP address and a port block, and the port block comprises the at least one port number.

10. The network device according to claim 9, wherein the at least one processor is further configured to execute the programming instructions to cause the network device to:
assign the port block to the user, wherein the port block comprises at least one port number; and
send the port block to the CP device.

11. A communications system in which a control plane (CP) and a user plane (UP) are separated, the communications system comprising a CP device and a NAT device,
wherein the CP device is configured to:
assign a first Internet protocol (IP) address to a user;
send the first IP address to a network address translation (NAT) device;
receive a second IP address from the NAT device, wherein the second IP address is a public network IP address that is assigned by the NAT device to the user based on the first IP address; and
send an accounting packet to a remote authentication dial in user service (RADIUS) server, wherein the accounting packet comprises the first IP address and the second IP address; and
wherein the NAT device is configured to:
receive the first IP address from the CP device;
assign the second IP address to the user; and
send the second IP address to the CP device.

12. The communications system according to claim 11, wherein the first IP address comprises at least one of a private network Internet protocol version 4 (IPV4) address or an Internet protocol version 6 (IPv6) address.

13. The communications system according to claim 11, wherein the communications system comprises a gateway system, and the gateway system is a broadband network gateway (BNG) system or a broadband remote access server (BRAS) system.

14. The communications system according to claim 11, wherein the accounting packet further comprises a port block, and the port block comprises at least one port number that is assigned by the NAT device to the user, and wherein the CP device is further configured to:
receive information about the user from the NAT device, wherein the information about the user comprises a correspondence among the first IP address, the second IP address, and the port block.

15. The communications system according to claim 11, wherein the CP device is further configured to:
receive a port block set from the RADIUS server, wherein the port block set comprises the port block; and
send the port block set to the NAT device.

16. The communications system according to claim 11, wherein the CP device is further configured to:
when the user is offline,
send a delete message to the NAT device, wherein the delete message indicates the NAT device to delete information that is about the user and that is stored in the NAT device; and
delete the information that is about the user and that is stored in the CP device.

17. The communications system according to claim 11, wherein the NAT device comprises an active NAT device and a standby NAT device, each of which is a reserve one to the other, and the CP device is further configured to:
receive information about the user from the active NAT device.

18. The communications system according to claim 17, wherein the CP device is further configured to:
send the information about the user to the standby NAT device.

* * * * *